United States Patent
Sudo et al.

(10) Patent No.: US 10,197,778 B2
(45) Date of Patent: Feb. 5, 2019

(54) ZOOM LENS AND IMAGE PICKUP APPARATUS INCLUDING THE SAME

(71) Applicant: CANON KABUSHIKI KAISHA, Tokyo (JP)

(72) Inventors: Kenta Sudo, Utsunomiya (JP); Shinji Yamasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/715,328

(22) Filed: Sep. 26, 2017

(65) Prior Publication Data

US 2018/0100994 A1    Apr. 12, 2018

(30) Foreign Application Priority Data

Oct. 11, 2016    (JP) ................................ 2016-200023
Oct. 11, 2016    (JP) ................................ 2016-200024

(51) Int. Cl.
| | |
|---|---|
| *G02B 15/14* | (2006.01) |
| *G02B 15/167* | (2006.01) |
| *G02B 7/10* | (2006.01) |
| *G02B 13/02* | (2006.01) |
| *G02B 15/177* | (2006.01) |
| *G02B 27/00* | (2006.01) |

(52) U.S. Cl.
CPC ............. *G02B 15/167* (2013.01); *G02B 7/10* (2013.01); *G02B 13/02* (2013.01); *G02B 15/177* (2013.01); *G02B 27/0025* (2013.01)

(58) Field of Classification Search
CPC ........ G02B 15/167; G02B 7/10; G02B 13/02; G02B 15/177; G02B 27/0025
USPC .................................................. 359/684, 689
See application file for complete search history.

(56) References Cited

U.S. PATENT DOCUMENTS

| | | | |
|---|---|---|---|
| 9,148,575 B2 | 9/2015 | Yamasaki | |
| 9,350,919 B2 | 5/2016 | Yamasaki | |
| 9,575,296 B2 | 2/2017 | Kimura et al. | |
| 2016/0266360 A1* | 9/2016 | Yamasaki | G02B 15/177 |
| 2016/0363759 A1 | 12/2016 | Sudo | |

FOREIGN PATENT DOCUMENTS

| | | |
|---|---|---|
| JP | 2009-025801 A | 2/2009 |
| JP | 2013-250338 A | 12/2013 |
| JP | 2014-219543 A | 11/2014 |

* cited by examiner

*Primary Examiner* — James Greece
(74) *Attorney, Agent, or Firm* — Carter, DeLuca, Farrell & Schmidt, LLP

(57) ABSTRACT

A zoom lens includes, in order from an object side to an image side: a negative first lens unit; a negative second lens unit; and a positive third lens unit, in which the first lens unit is not moved for zooming, the second lens unit and the third lens unit are moved during zooming, and an interval between each pair of adjacent lens units is changed during zooming, in which the first lens unit includes at least two negative lenses, and a focal length of the first lens unit, a focal length of the zoom lens at a wide angle end, a focal length of the zoom lens at a telephoto end, an interval on an optical axis between the first lens unit and the second lens unit at the wide angle end, and a back focus at the wide angle end are appropriately set.

17 Claims, 14 Drawing Sheets

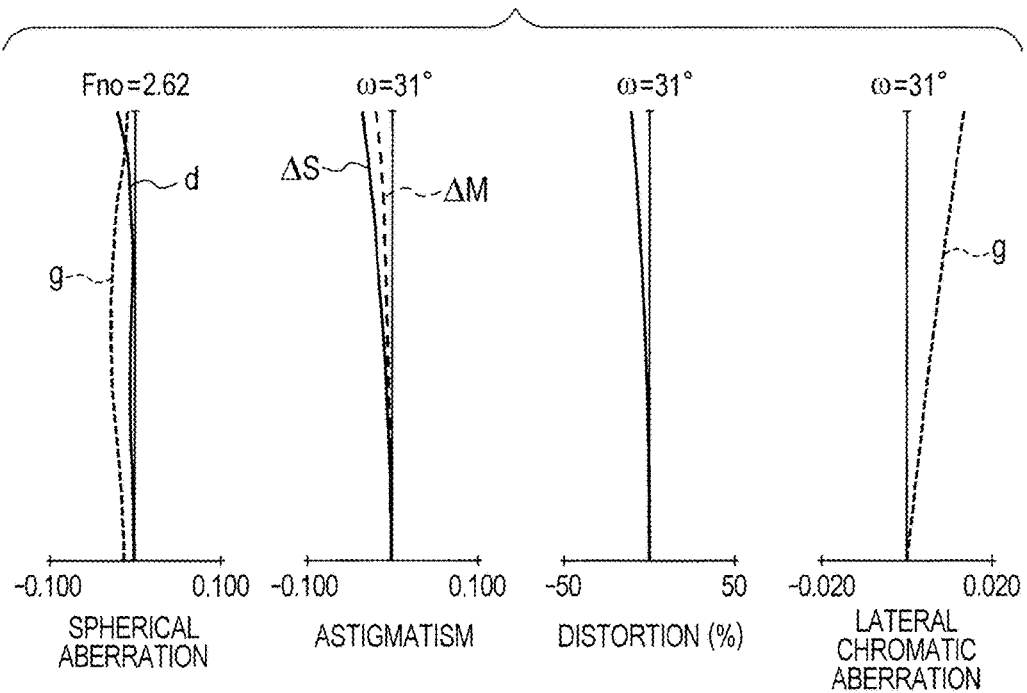
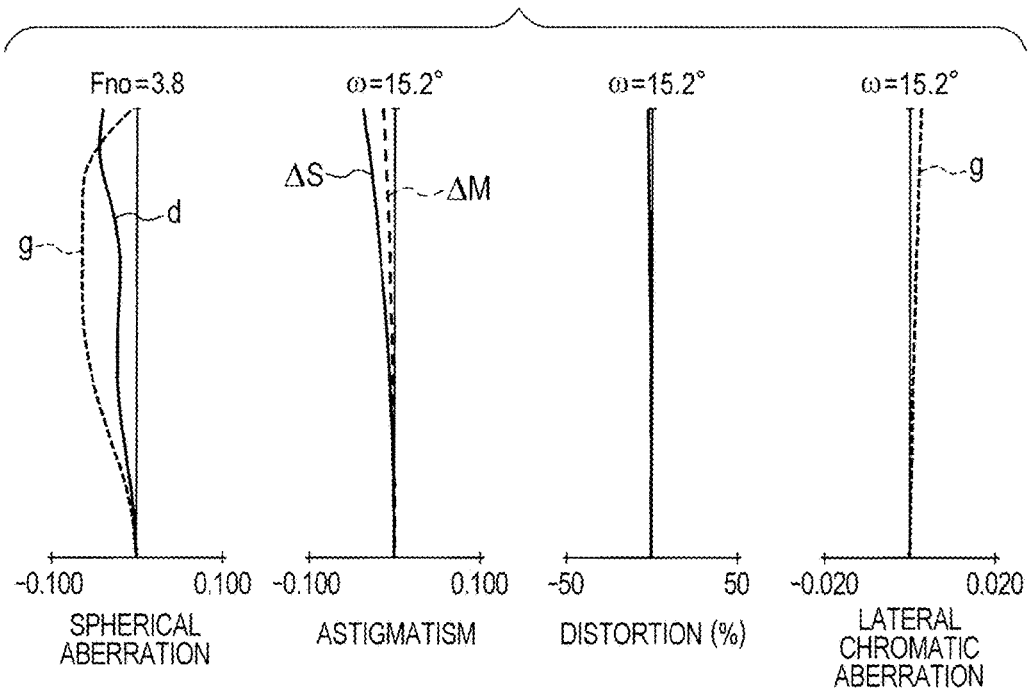

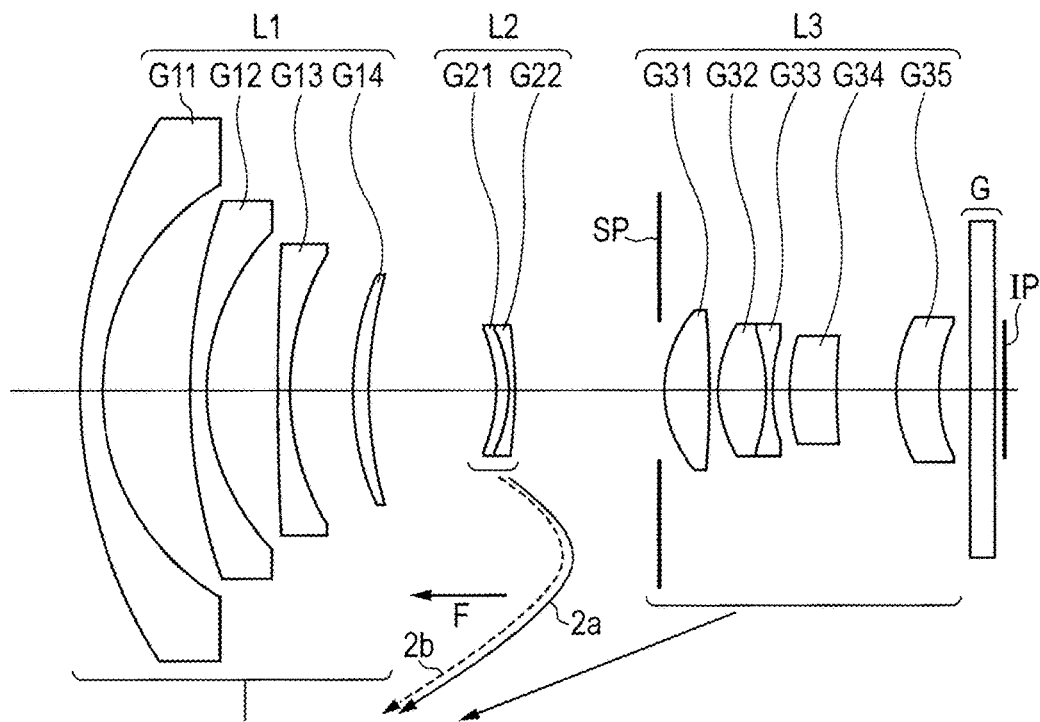
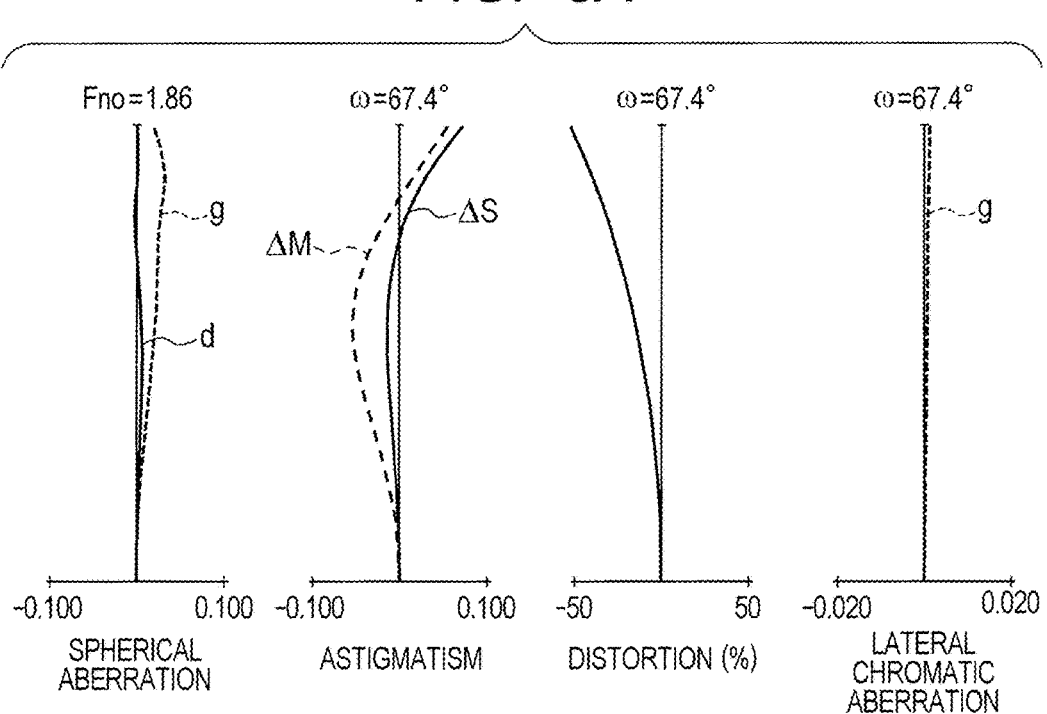

ZOOM LENS AND IMAGE PICKUP APPARATUS INCLUDING THE SAME

BACKGROUND OF THE INVENTION

Field of the Invention

The present invention relates to a zoom lens, and more particularly, to a zoom lens suitable as an image pickup optical system to be used in an image pickup apparatus, such as a monitoring camera, a digital camera, a video camera, and a broadcasting camera.

Description of the Related Art

In recent years, an image pickup optical system to be used in an image pickup apparatus that uses an image pickup element is demanded to be a wide-angle zoom lens being capable of taking images with various magnifications, and having high optical performance that allows the zoom lens to support the image pickup element having increased pixel counts (increased resolution). In terms of increased definition, for example, the transition from standard definition (SD) resolution to megapixel resolution, full high definition (HD) resolution, and 4 K resolution has been accelerated. An image pickup optical system to be used in an image pickup apparatus is accordingly demanded to be a zoom lens having high optical performance that allows the zoom lens to support those high-resolution image pickup elements.

Further, an image pickup optical system for a monitoring camera is demanded to have a high zoom ratio and a high degree of freedom in monitoring while enabling easy image taking over a wide area by one camera (having an increased angle of view). In addition, the entire system of such an image pickup optical system is demanded to be compact so that the image pickup optical system can easily be installed indoors and outdoors and be inconspicuous, for example. As zoom lenses that meet those demands, there are known negative lead type zoom lenses in each of which a lens unit having a negative refractive power is arranged closest to an object side (located closest to the object side) (Japanese Patent Application Laid-Open No. 2013-250338, Japanese Patent Application Laid-Open No. 2009-25801, and Japanese Patent Application Laid-Open No. 2014-219543).

In Japanese Patent Application Laid-Open No. 2013-250338, there is disclosed a zoom lens including, in order from an object side to an image side, a first lens unit to a fourth lens unit having negative, positive, negative, and positive refractive powers, in which each lens unit is configured to move and an interval between each pair of adjacent lens units is changed, during zooming. In each of Japanese Patent Application Laid-Open No. 2009-25801 and Japanese Patent Application Laid-Open No. 2014-219543, there is disclosed a zoom lens including, in order from an object side to an image side, a first lens unit to a fourth lens unit having negative, negative, positive, and positive refractive powers, in which the second lens unit and the third lens unit are configured to move and an interval between each pair of adjacent lens units is changed, during zooming.

In order to achieve a negative lead type zoom lens that combines high optical performance with a downsized entire lens system size, an increased angle of view, and an increased zoom ratio, it is important to appropriately set the refractive power of each lens unit, the lens configuration of each lens unit, and other factors.

In the case of a negative lead type zoom lens in which a first lens unit is configured to move during zooming from a wide angle end to a telephoto end, a further increase in angle of view leads to an increase in size of the first lens unit. Further, an increase in zoom ratio leads to an increase in movement amount of the first lens unit, which means that the entire lens system is increased in size. Meanwhile, in the case of a negative lead type zoom lens in which a first lens unit is configured not to move during zooming, it is necessary to appropriately select a magnification varying lens unit and set the movement amount of the magnification varying lens unit during zooming. It is otherwise difficult to downsize the entire lens system while obtaining a predetermined zoom ratio (high zoom ratio).

SUMMARY OF THE INVENTION

The present invention has an object to provide a zoom lens that is compact as an entire lens system, and has a wide angle of view, a high zoom ratio, and high optical performance over the entire zoom range.

According to one embodiment of the present invention, there is provided a zoom lens, including, in order from an object side to an image side: a first lens unit having a negative refractive power; a second lens unit having a negative refractive power; and a third lens unit having a positive refractive power, in which the first lens unit is not moved for zooming, the second lens unit and the third lens unit are moved during zooming, and an interval between each pair of adjacent lens units is changed during zooming, in which the first lens unit includes at least two negative lenses, and in which the following conditional expressions are satisfied:

$$0.70 < |f1/(fw \times ft)^{(1/2)}| < 2.70; \text{ and}$$

$$0.60 < D12w/BFw < 5.30,$$

where f1 represents a focal length of the first lens unit, fw represents a focal length of the zoom lens at a wide angle end, ft represents a focal length of the zoom lens at a telephoto end, D12w represents an interval on an optical axis between the first lens unit and the second lens unit at the wide angle end, and BFw represents a back focus at the wide angle end.

Further features of the present invention will become apparent from the following description of exemplary embodiments with reference to the attached drawings.

BRIEF DESCRIPTION OF THE DRAWINGS

FIG. 4B is an aberration diagram at an intermediate zoom position of the zoom lens of Embodiment 2.

FIG. 4C is an aberration diagram at a telephoto end of the zoom lens of Embodiment 2.

FIG. 7 is a lens cross-sectional view and a diagram of movement loci at a wide angle end of a zoom lens according to Embodiment 4 of the present invention.

FIG. 8A is an aberration diagram at the wide angle end of the zoom lens of Embodiment 4.

DESCRIPTION OF THE EMBODIMENTS

Preferred embodiments of the present invention will now be described in detail in accordance with the accompanying drawings.

Now, a zoom lens and an image pickup apparatus including the zoom lens of the present invention are described. The zoom lens of the present invention includes, in order from an object side to an image side: a first lens unit having a negative refractive power; a second lens unit having a negative refractive power; and a third lens unit having a positive refractive power. During zooming, the first lens unit is configured not to move, the second lens unit and the third lens unit are configured to move, and an interval between each pair of adjacent lens units is changed.

Figure 1:
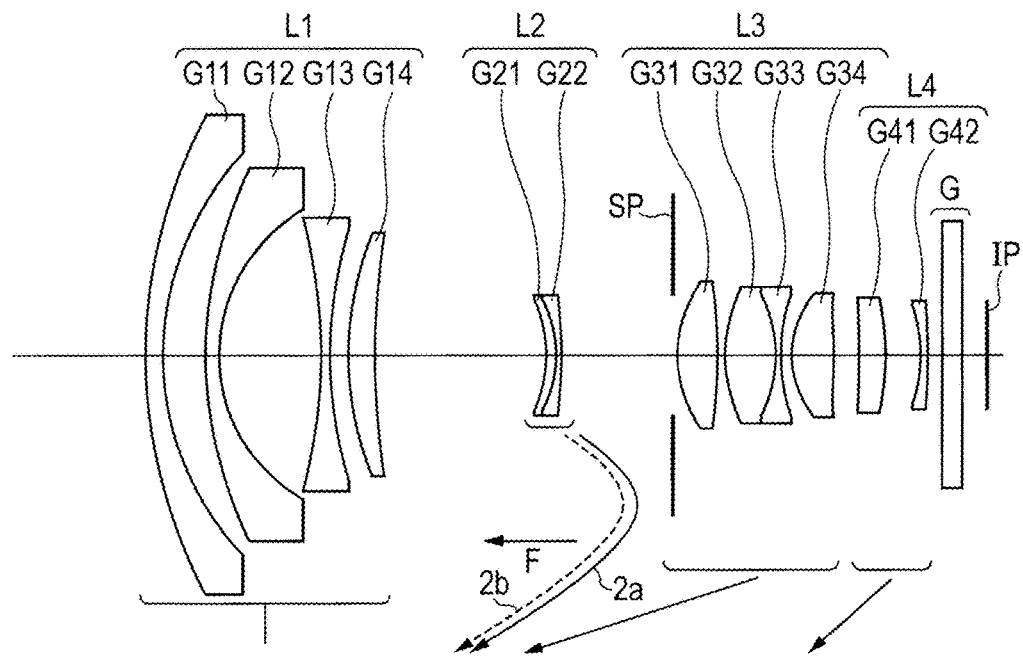
FIG. 1 is a lens cross-sectional view and a diagram of movement loci at a wide angle end of a zoom lens according to Embodiment 1 of the present invention.
Figure 2A:
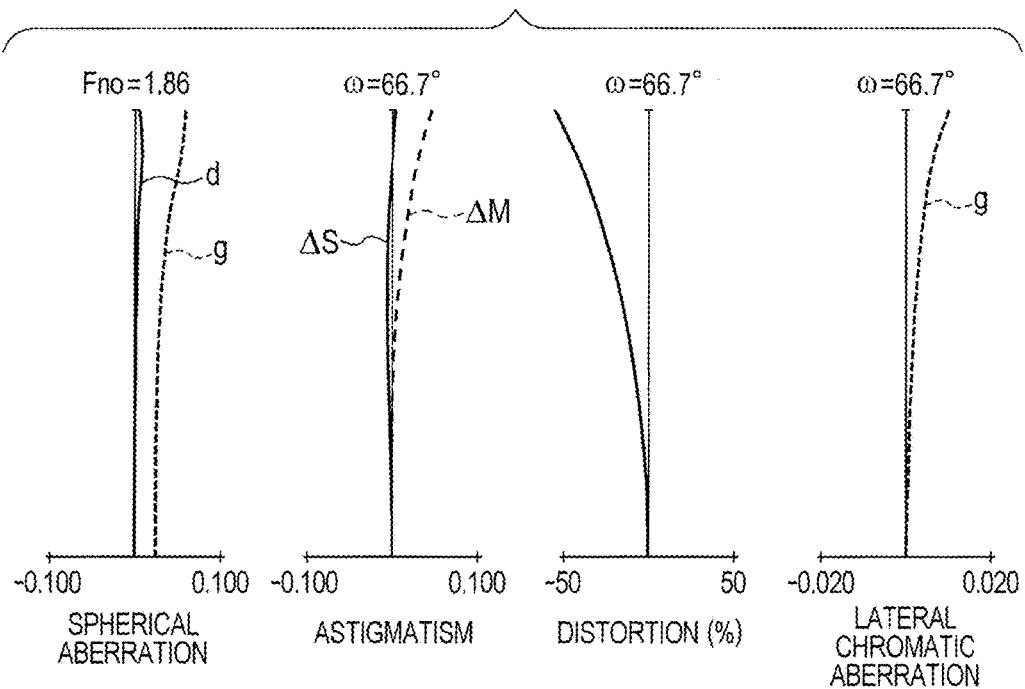
FIG. 2A is an aberration diagram at the wide angle end of the zoom lens of Embodiment 1.
Figure 2B:
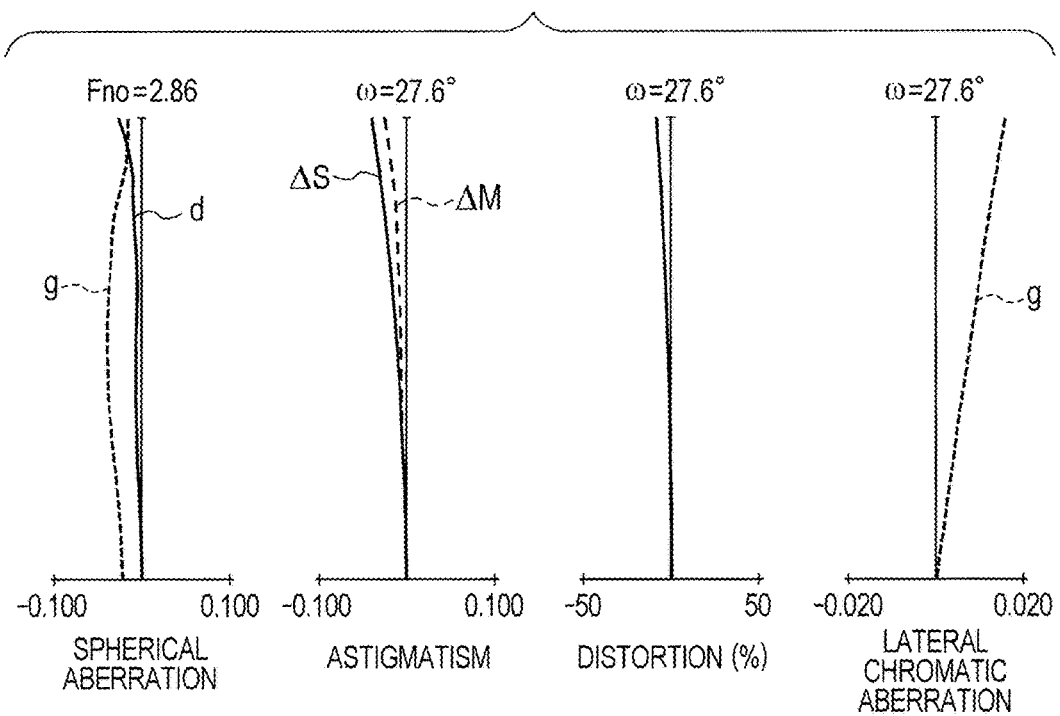
FIG. 2B is an aberration diagram at an intermediate zoom position of the zoom lens of Embodiment 1.
Figure 2C:
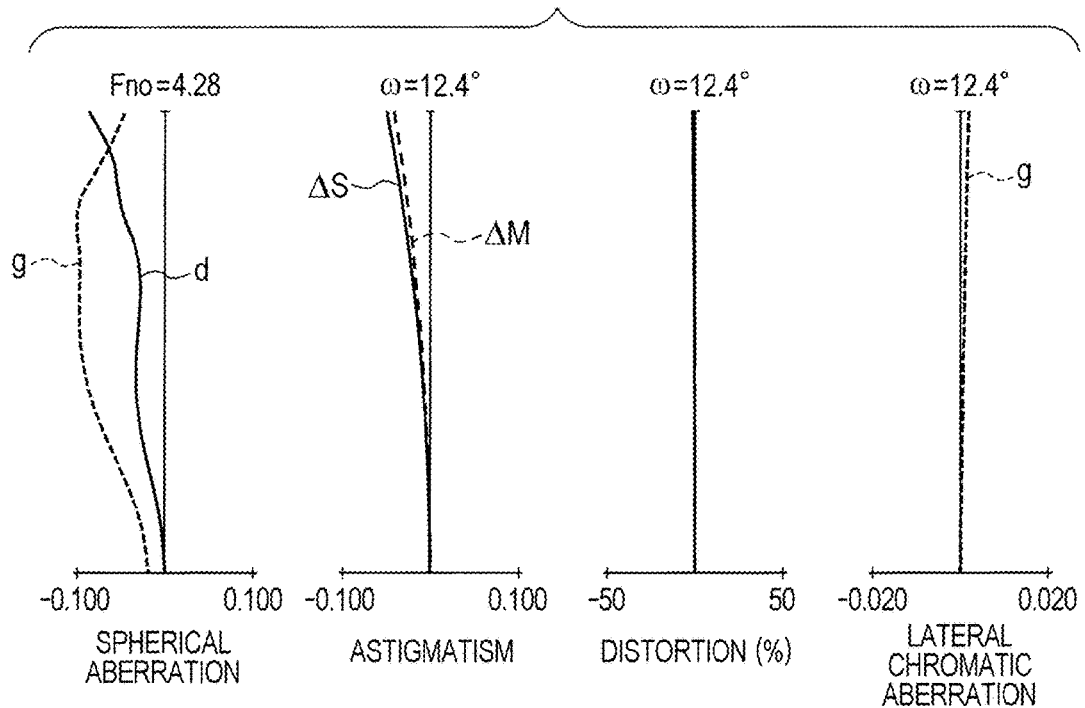
FIG. 2C is an aberration diagram at a telephoto end of the zoom lens of Embodiment 1.

FIG. 1 is a lens cross-sectional view at a wide angle end (short focal length end) of a zoom lens according to Embodiment 1 of the present invention. FIG. 2A, FIG. 2B, and FIG. 2C are aberration diagrams at the wide angle end, an intermediate zoom position, and a telephoto end (long focal length end), respectively, of the zoom lens according to Embodiment 1 of the present invention. The zoom lens according to Embodiment 1 has a zoom ratio of 4.86 and an F number of from 1.86 to 4.28.

Figure 3:
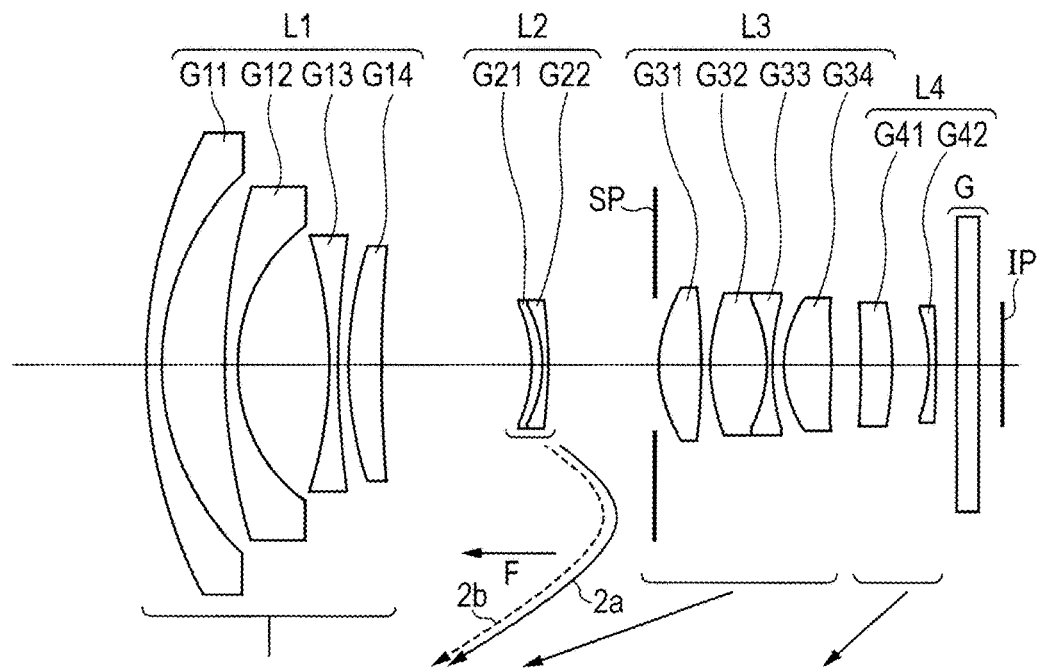
FIG. 3 is a lens cross-sectional view and a diagram of movement loci at a wide angle end of a zoom lens according to Embodiment 2 of the present invention.
Figure 4A:
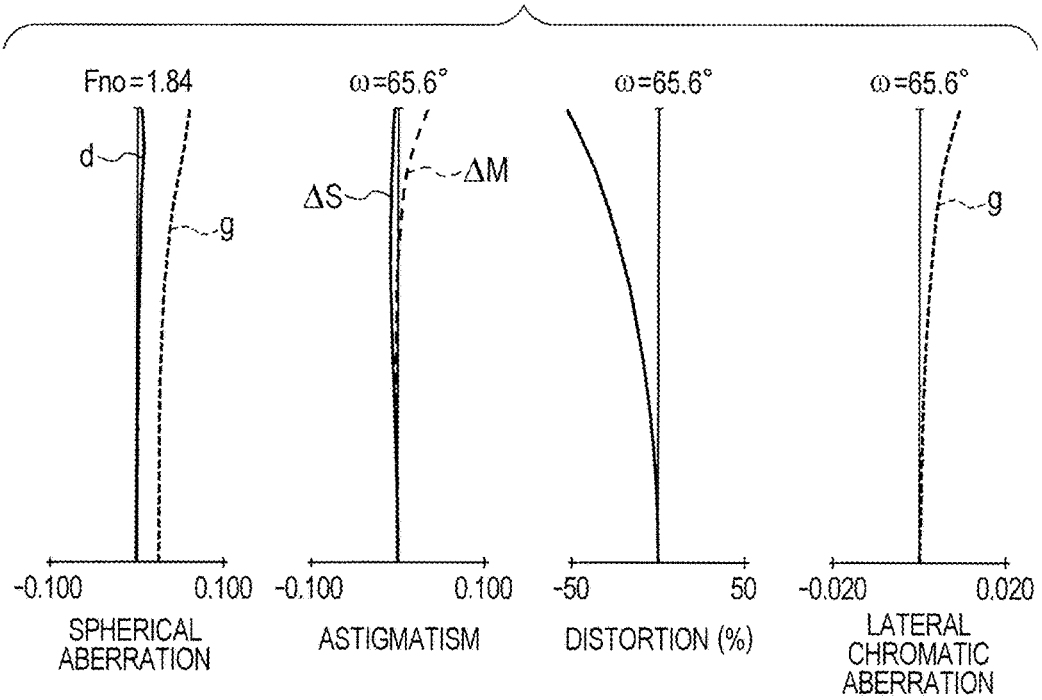
FIG. 4A is an aberration diagram at the wide angle end of the zoom lens of Embodiment 2.

FIG. 3 is a lens cross-sectional view at a wide angle end of a zoom lens according to Embodiment 2 of the present invention. FIG. 4A, FIG. 4B, and FIG. 4C are aberration diagrams at the wide angle end, an intermediate zoom position, and a telephoto end, respectively, of the zoom lens according to Embodiment 2 of the present invention. The zoom lens according to Embodiment 2 has a zoom ratio of 3.90 and an F number of from 1.84 to 3.80.

Figure 5:
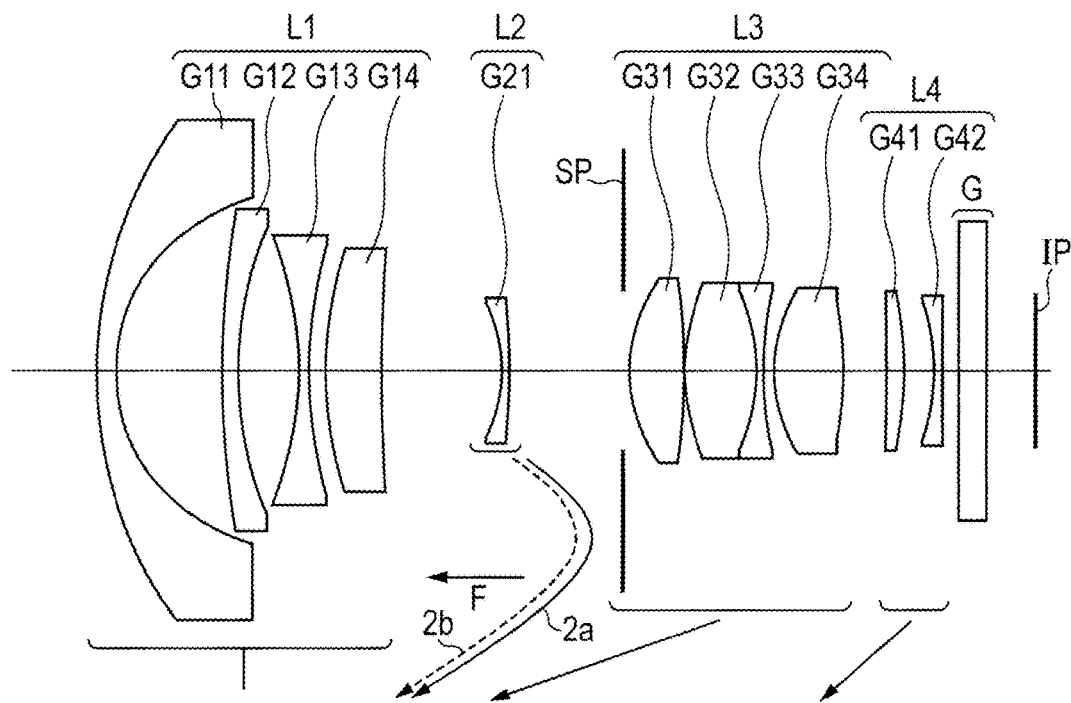
FIG. 5 is a lens cross-sectional view and a diagram of movement loci at a wide angle end of a zoom lens according to Embodiment 3 of the present invention.
Figure 6A:
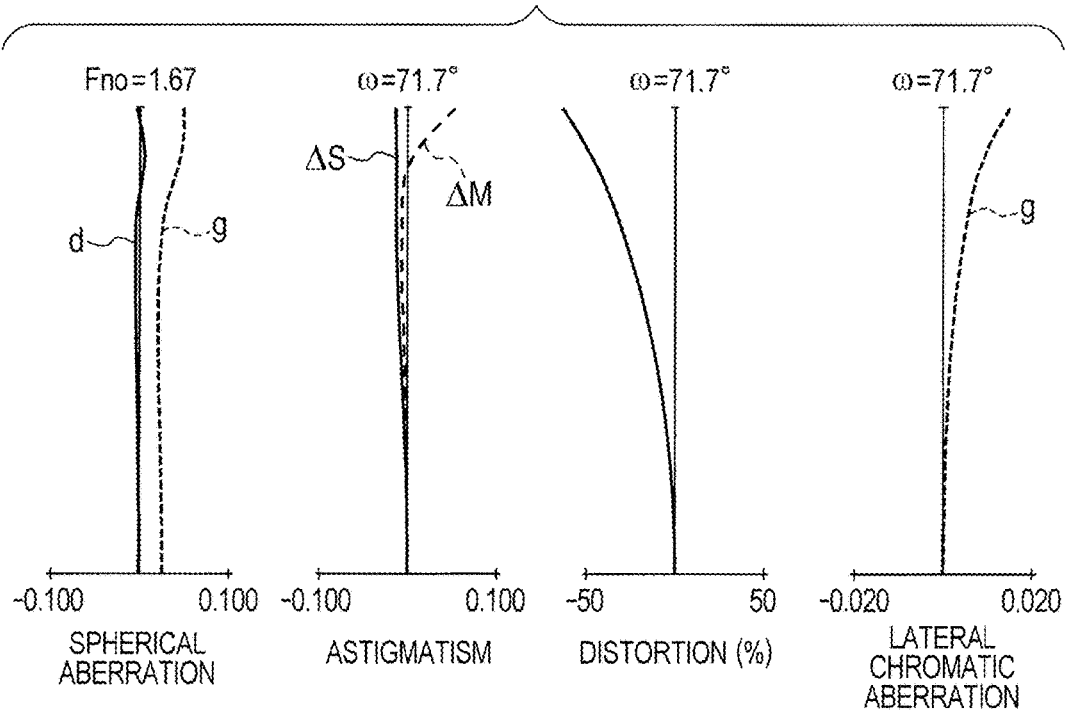
FIG. 6A is an aberration diagram at the wide angle end of the zoom lens of Embodiment 3.
Figure 6B:
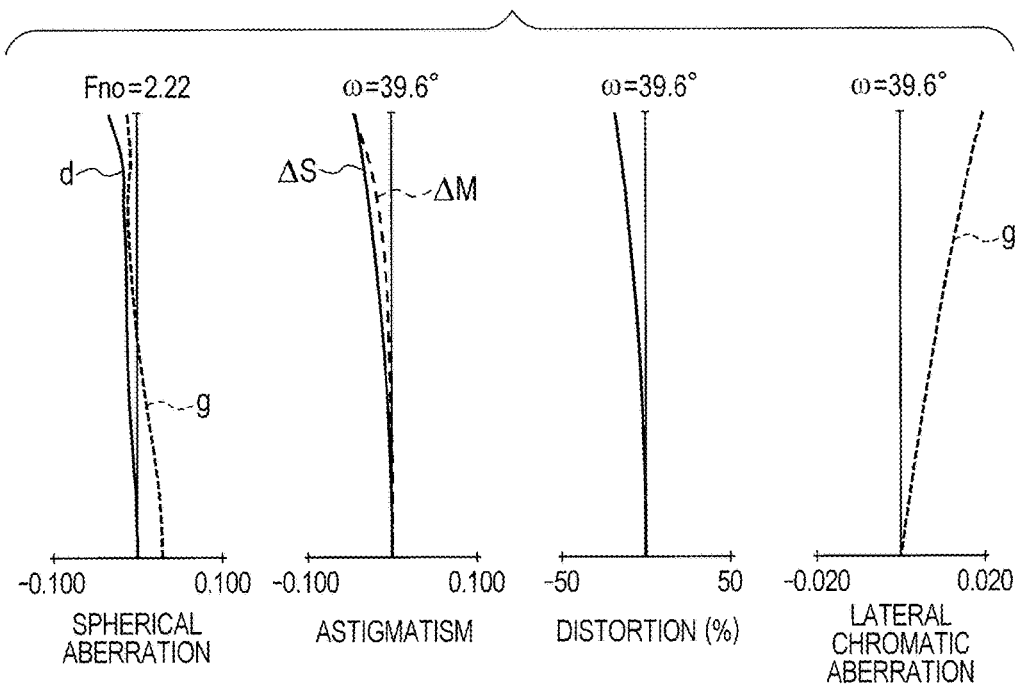
FIG. 6B is an aberration diagram at an intermediate zoom position of the zoom lens of Embodiment 3.
Figure 6C:
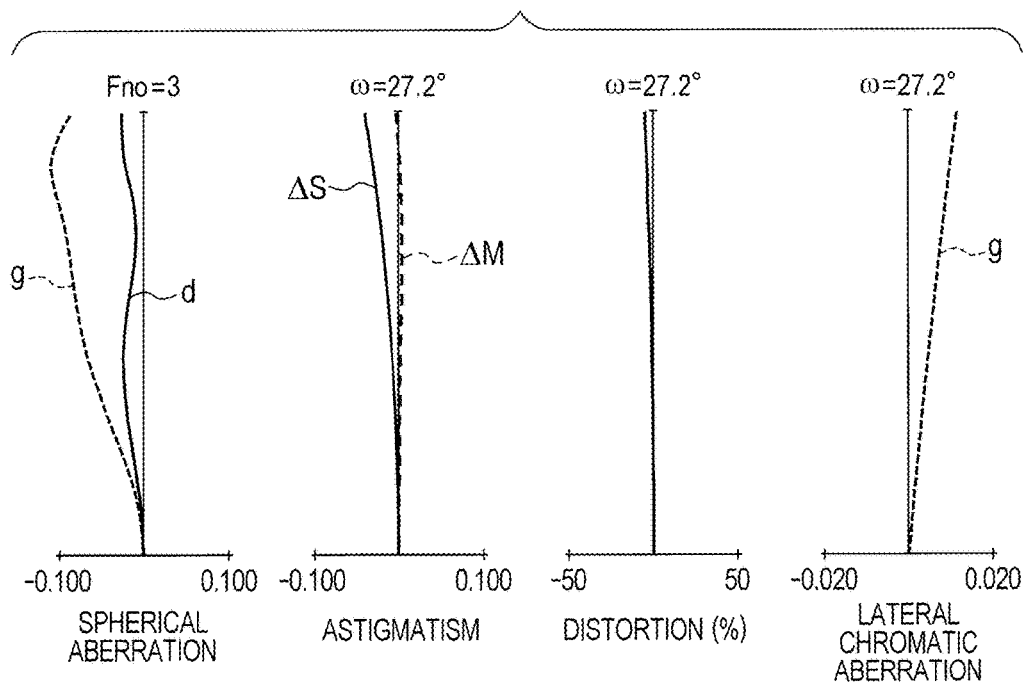
FIG. 6C is an aberration diagram at a telephoto end of the zoom lens of Embodiment 3.

FIG. 5 is a lens cross-sectional view at a wide angle end of a zoom lens according to Embodiment 3 of the present invention. FIG. 6A, FIG. 6B, and FIG. 6C are aberration diagrams at the wide angle end, an intermediate zoom position, and a telephoto end, respectively, of the zoom lens according to Embodiment 3 of the present invention. The zoom lens according to Embodiment 3 has a zoom ratio of 2.89 and an F number of from 1.67 to 3.00.

Figure 8B:
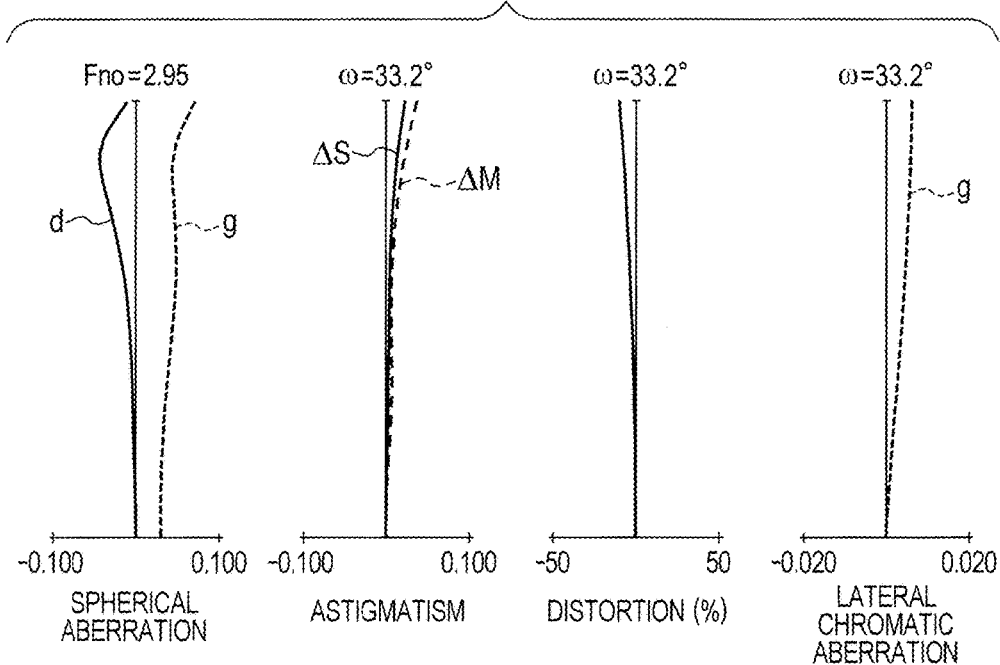
FIG. 8B is an aberration diagram at an intermediate zoom position of the zoom lens of Embodiment 4.
Figure 8C:
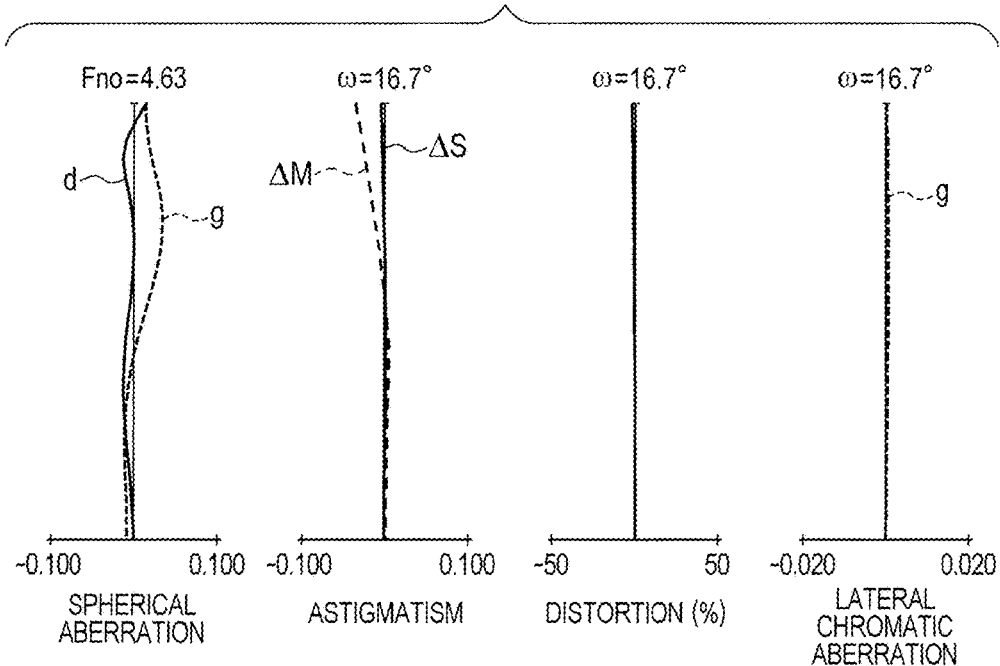
FIG. 8C is an aberration diagram at a telephoto end of the zoom lens of Embodiment 4.

FIG. 7 is a lens cross-sectional view at a wide angle end of a zoom lens according to Embodiment 4 of the present invention. FIG. 8A, FIG. 8B, and FIG. 8C are aberration diagrams at the wide angle end, an intermediate zoom position, and a telephoto end, respectively, of the zoom lens according to Embodiment 4 of the present invention. The zoom lens according to Embodiment 4 has a zoom ratio of 3.90 and an F number of from 1.86 to 4.63.

Figure 9:
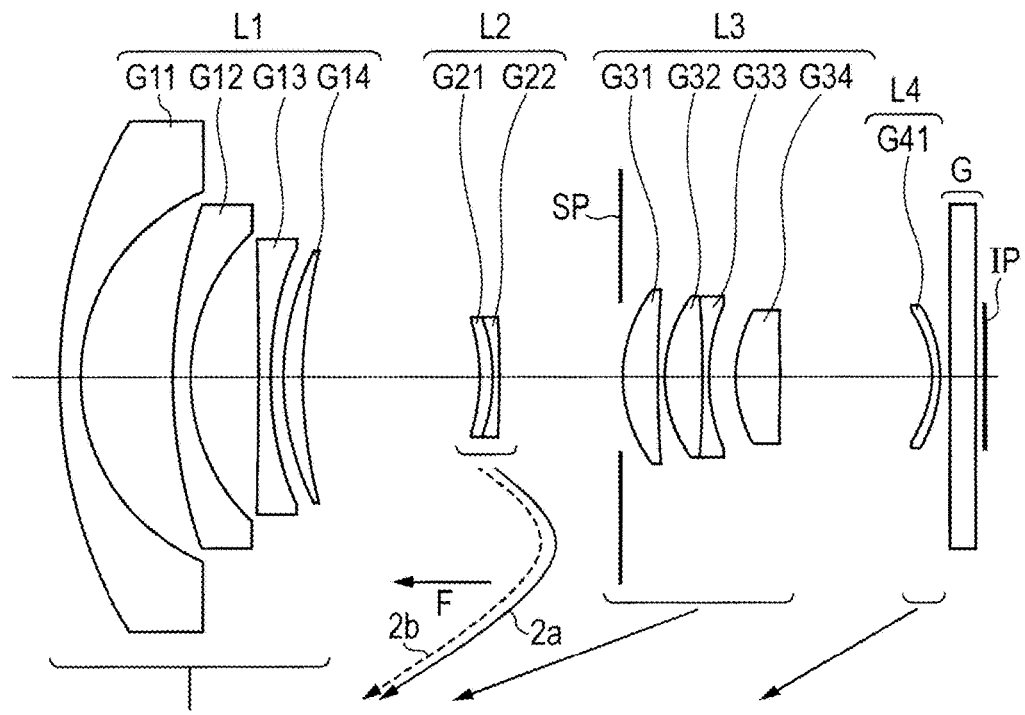
FIG. 9 is a lens cross-sectional view and a diagram of movement loci at a wide angle end of a zoom lens according to Embodiment 5 of the present invention.
Figure 10A:
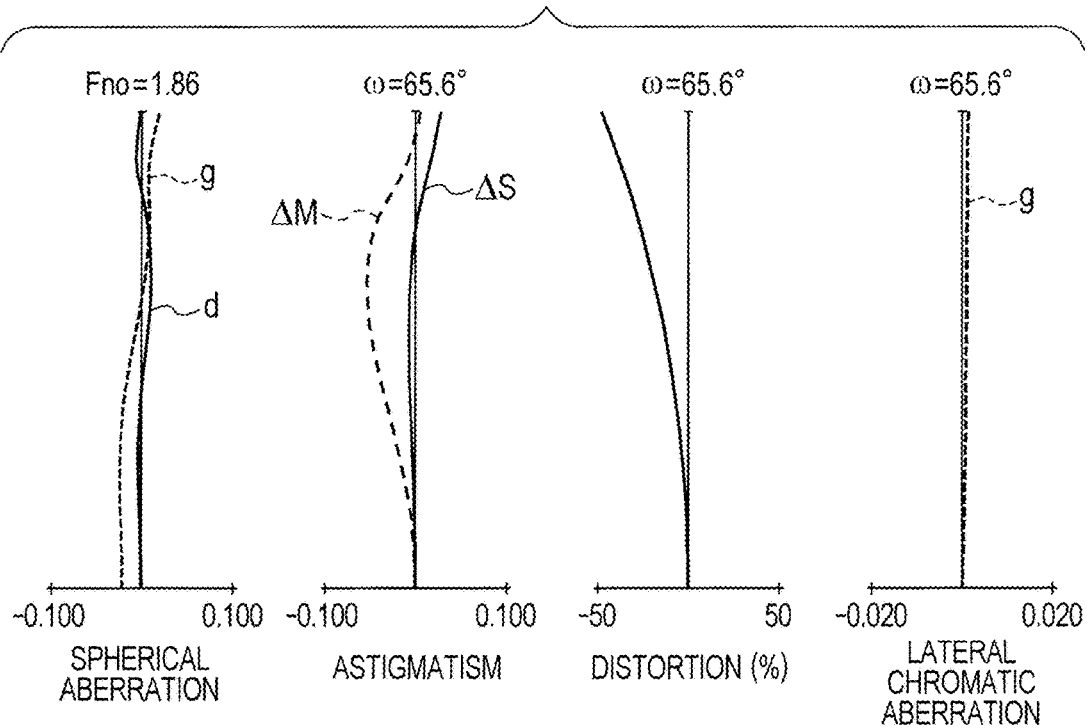
FIG. 10A is an aberration diagram at the wide angle end of the zoom lens of Embodiment 5.
Figure 10B:
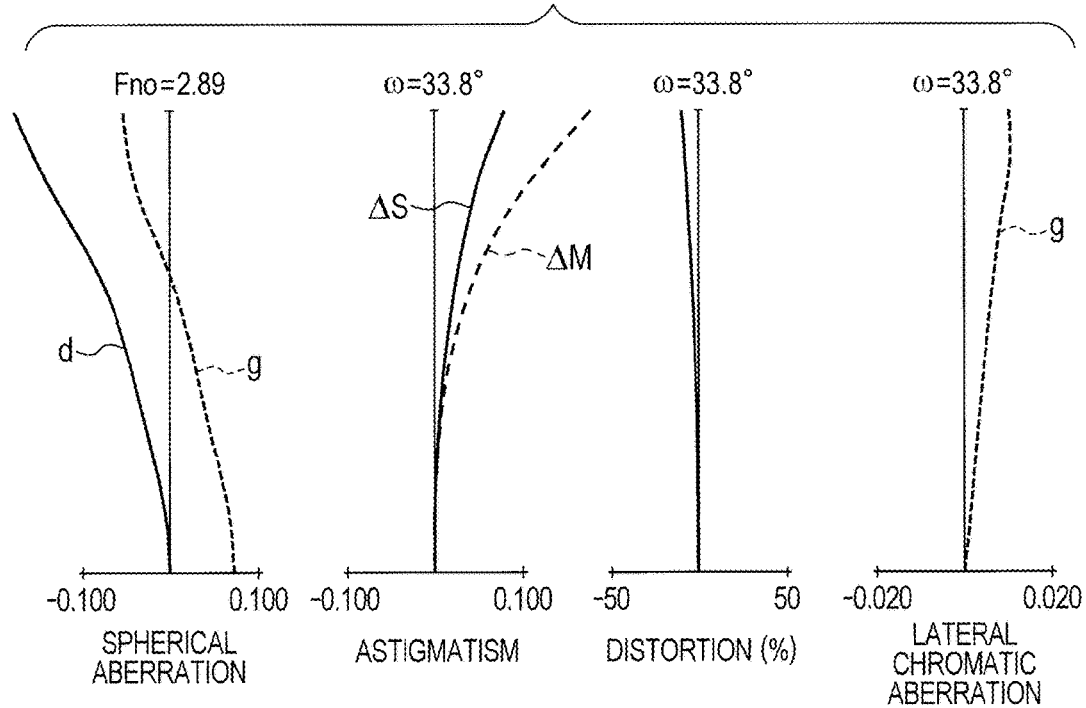
FIG. 10B is an aberration diagram at an intermediate zoom position of the zoom lens of Embodiment 5.
Figure 10C:
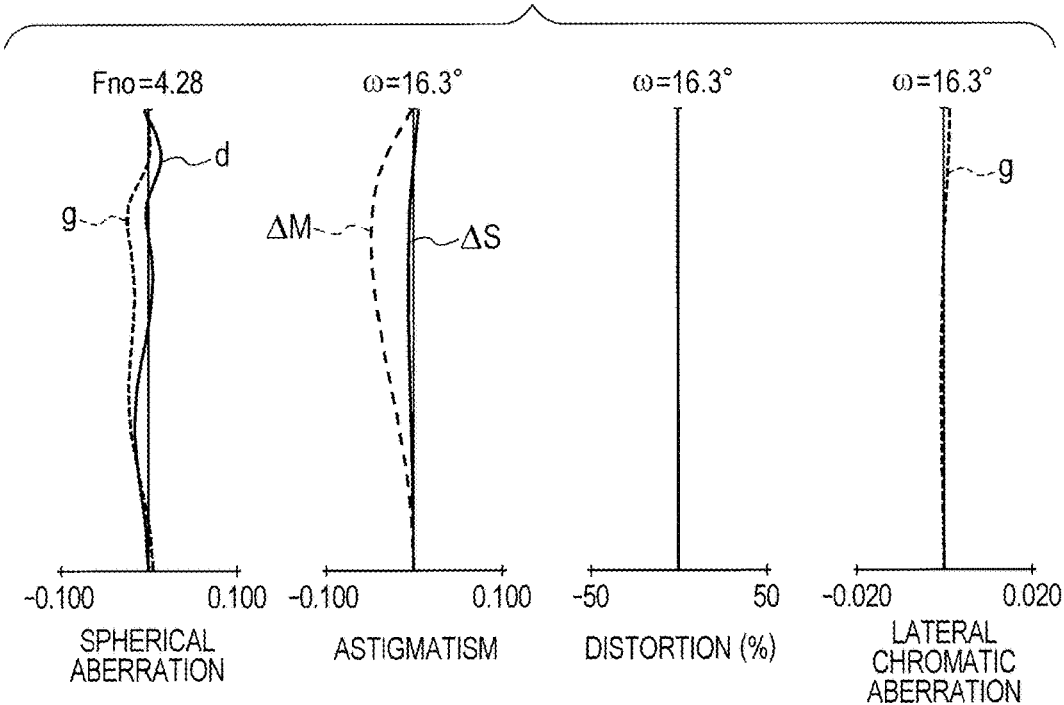
FIG. 10C is an aberration diagram at a telephoto end of the zoom lens of Embodiment 5.

FIG. 9 is a lens cross-sectional view at a wide angle end of a zoom lens according to Embodiment 5 of the present invention. FIG. 10A, FIG. 10B, and FIG. 10C are aberration diagrams at the wide angle end, an intermediate zoom position, and a telephoto end, respectively, of the zoom lens according to Embodiment 5 of the present invention. The zoom lens according to Embodiment 5 has a zoom ratio of 3.94 and an F number of from 1.86 to 4.28.

Figure 11:
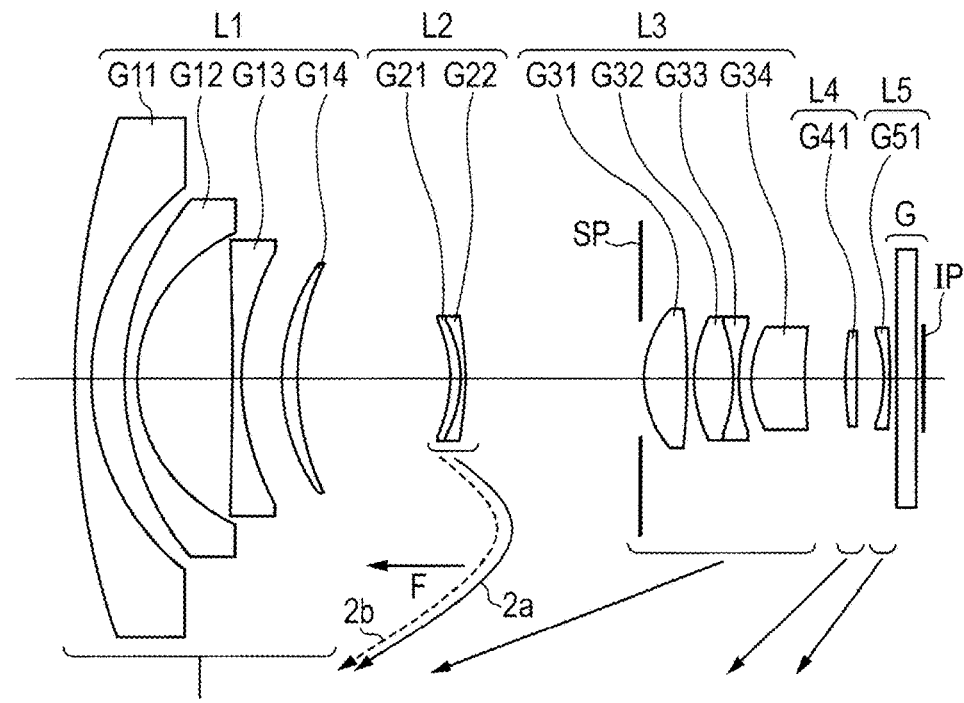
FIG. 11 is a lens cross-sectional view and a diagram of movement loci at a wide angle end of a zoom lens according to Embodiment 6 of the present invention.
Figure 12A:
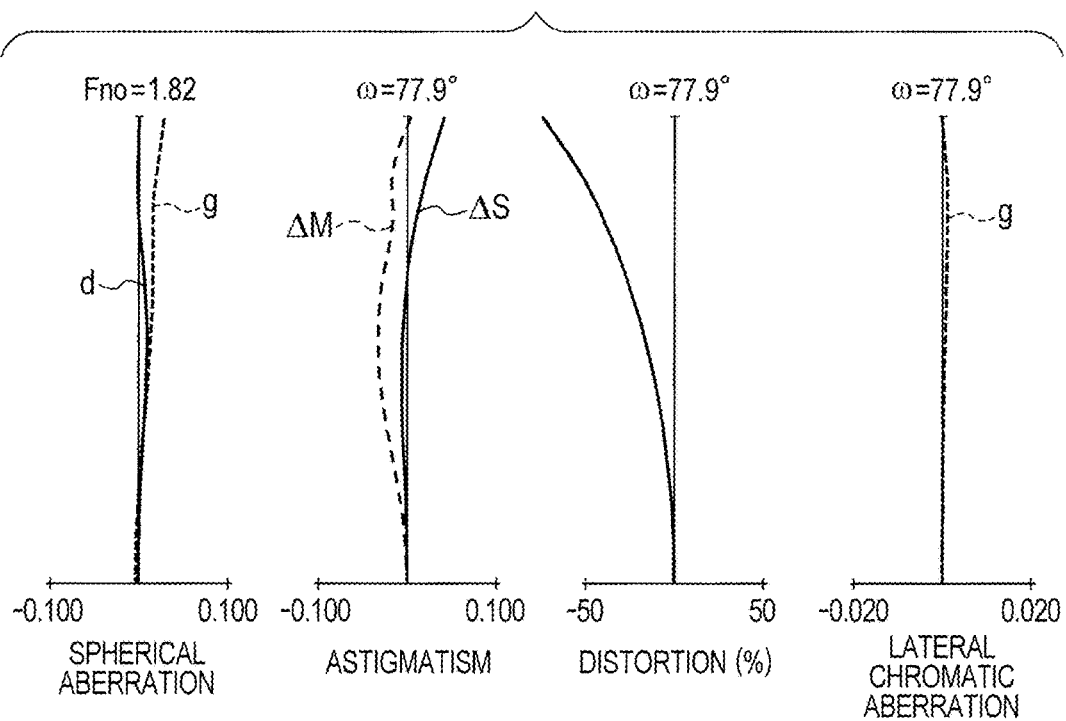
FIG. 12A is an aberration diagram at the wide angle end of the zoom lens of Embodiment 6.
Figure 12B:
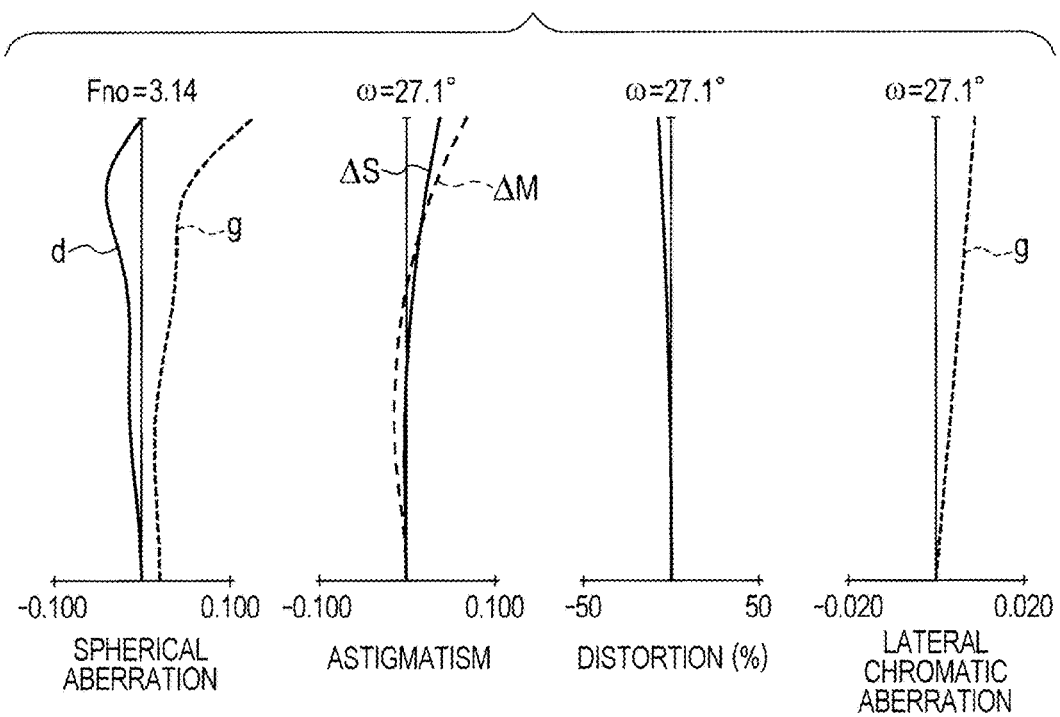
FIG. 12B is an aberration diagram at an intermediate zoom position of the zoom lens of Embodiment 6.
Figure 12C:
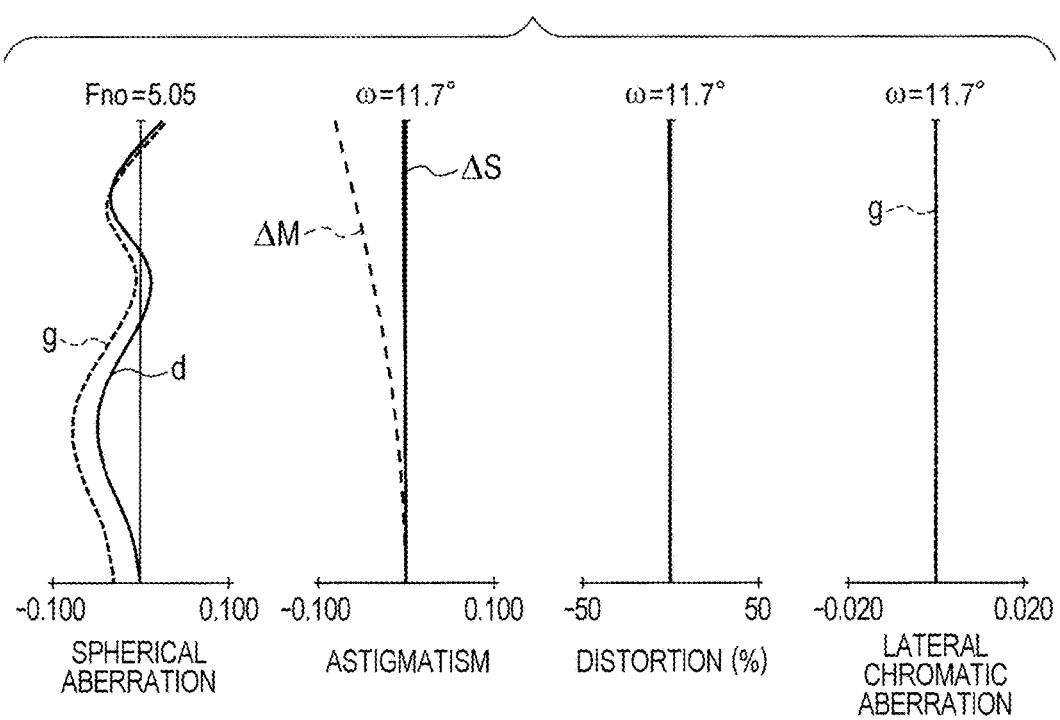
FIG. 12C is an aberration diagram at a telephoto end of the zoom lens of Embodiment 6.

FIG. 11 is a lens cross-sectional view at a wide angle end of a zoom lens according to Embodiment 6 of the present invention. FIG. 12A, FIG. 12B, and FIG. 12C are aberration diagrams at the wide angle end, an intermediate zoom position, and a telephoto end, respectively, of the zoom lens according to Embodiment 6 of the present invention. The zoom lens according to Embodiment 6 has a zoom ratio of 5.90 and an F number of from 1.82 to 5.05.

Figure 13:
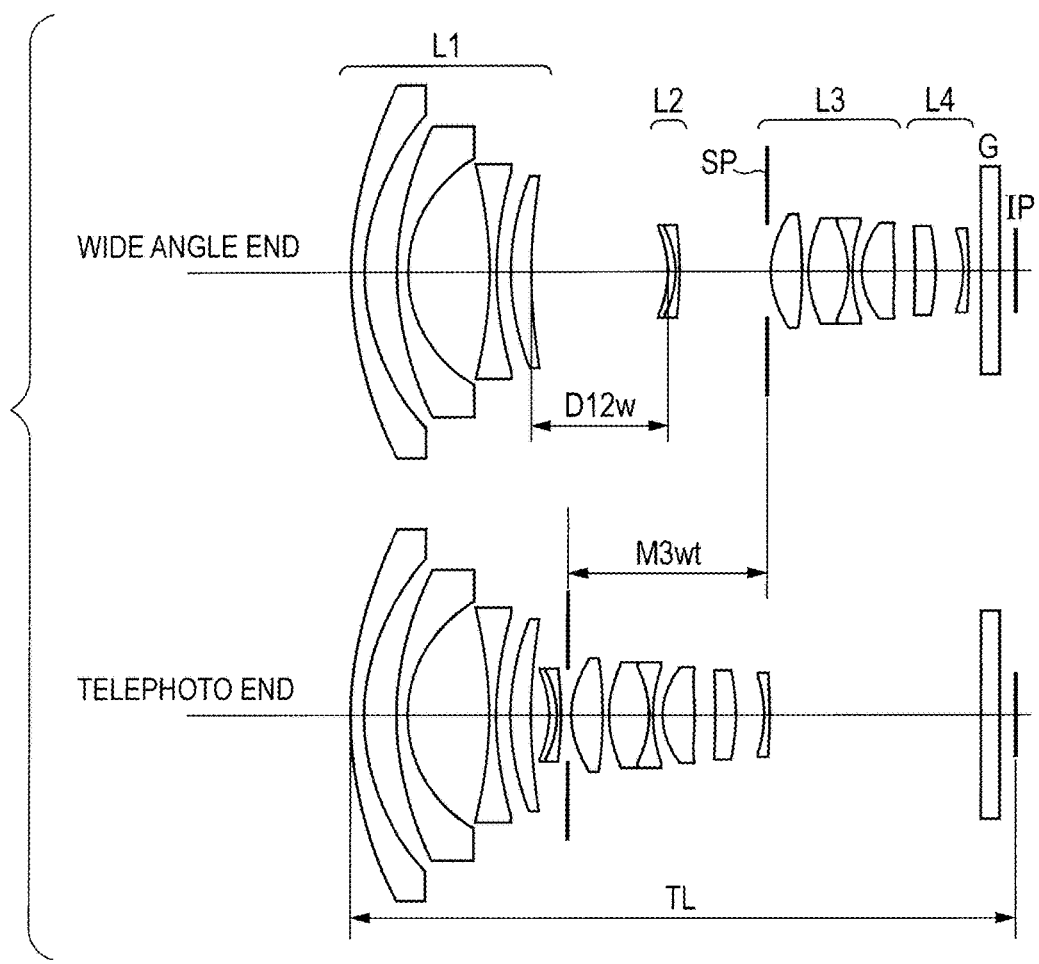
FIG. 13 is views for illustrating lens cross sections at the wide angle end and the telephoto end with reference symbols.
Figure 14A:
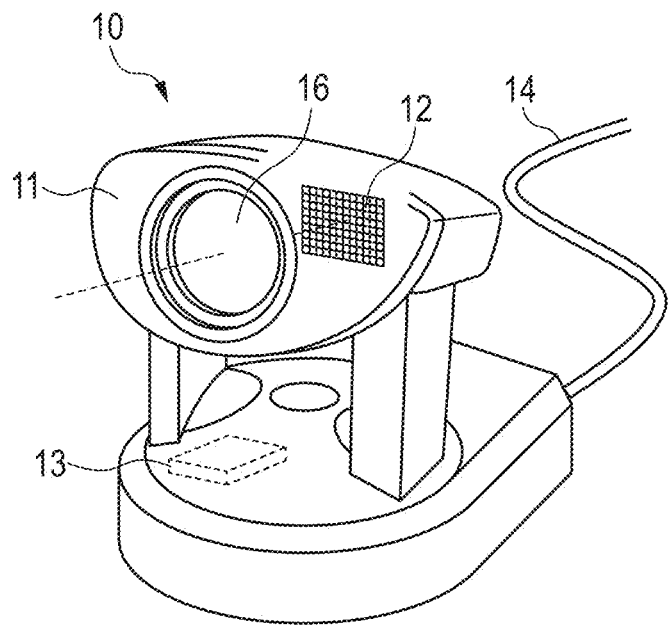
FIG. 14A is a view of an embodiment of use in a monitoring camera of the present invention.
Figure 14B:
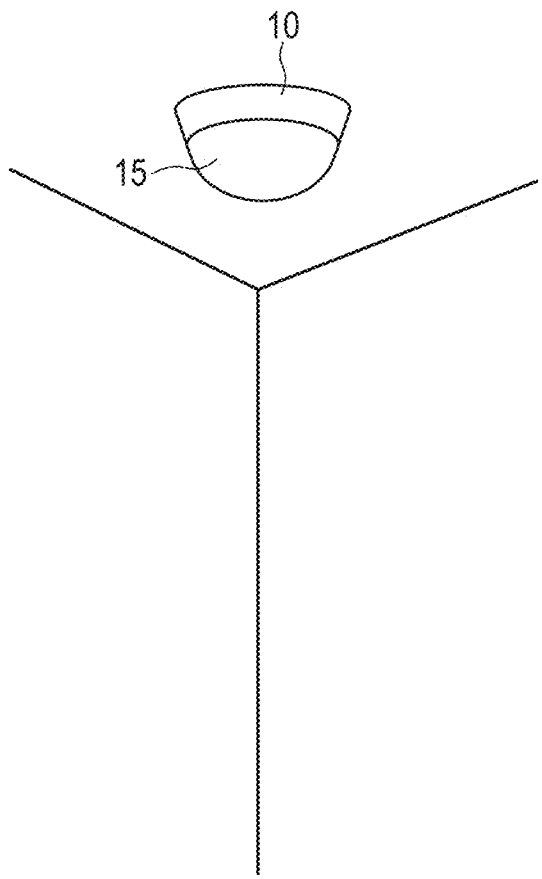
FIG. 14B is a view of an embodiment of use in a monitoring camera of the present invention.

FIG. 13 is explanatory views of positional relationships of the lens units of the zoom lens of the present invention at the wide angle end and the telephoto end. FIG. 14A and FIG. 14B are schematic views of image pickup apparatus, for example, monitoring cameras, including the zoom lens of the present invention.

The zoom lens of each Embodiment is an image pickup optical system to be used in an image pickup apparatus. In the lens cross-sectional views, the left side is the object side (front side), and the right side is the image side (rear side). The zoom lens of each Embodiment may be used for a projection optical system of a projector or other optical devices. In such a case, the left side is a screen, and the right side is an image to be projected. In the lens cross-sectional views, an F number determination member (hereinafter referred to also as "aperture stop") SP has a function of an aperture stop for determining (limiting) an open F number (Fno) light flux.

An optical block G corresponds to an optical filter, a face plate, a crystal low pass filter, an infrared cut filter, or the like. As an image plane IP, an image pickup surface of a solid-state image pickup element (photoelectric transducer) such as a CCD sensor or a CMOS sensor is arranged when the zoom lens is used as an imaging optical system of a video camera or a digital still camera.

The solid arrows indicate movement loci of the lens units for zooming from the wide angle end to the telephoto end. The solid arrow 2a concerning a second lens unit L2 indicates a movement locus for zooming from the wide angle end to the telephoto end when focusing at infinity. Moreover, the broken arrow 2b indicates a movement locus for the zooming from the wide angle end to the telephoto end when focusing at short distance. The arrow F indicates a movement direction for focusing from the infinity to the short distance.

The second lens unit L2 corresponds to a compensator lens unit configured to correct image plane variation accompanying magnification varying. The wide angle end and the telephoto end refer to zoom positions when a magnification varying lens unit is located at the ends of a range in which the magnification varying lens unit is mechanically movable on an optical axis.

The zoom lens of each of Embodiments 1, 2, 3, and 5 includes, in order from the object side to the image side, a first lens unit L1 having a negative refractive power, a second lens unit L2 having a negative refractive power, a third lens unit L3 having a positive refractive power, and a fourth lens unit L4 having a negative refractive power. The lens units are configured to move as indicated by the arrows during zooming from the wide angle end to the telephoto end. The zoom lens of Embodiment 4 includes, in order from the object side to the image side, a first lens unit L1 having a negative refractive power, a second lens unit L2 having a negative refractive power, and a third lens unit L3 having a positive refractive power. The lens units are configured to move as indicated by the arrows during zooming from the wide angle end to the telephoto end.

The zoom lens of Embodiment 6 includes, in order from the object side to the image side, a first lens unit L1 having a negative refractive power, a second lens unit L2 having a negative refractive power, a third lens unit L3 having a positive refractive power, a fourth lens unit L4 having a positive refractive power, and a fifth lens unit L5 having a negative refractive power. The lens units are configured to move as indicated by the arrows during zooming from the wide angle end to the telephoto end.

An aperture stop SP is arranged on the object side of the third lens unit L3, and is configured to move integrally with the third lens unit L3 in zooming. However, the aperture stop SP may be configured to move independently, which increases the degree of freedom in cutting flare rays and hence is preferred. In the spherical aberration diagrams and the lateral chromatic aberration diagrams of the aberration diagrams, the solid line d represents a d-line (587.56 nm), and the broken line g represents a g-line (435.84 nm). In the astigmatism diagrams, the dotted line ΔM represents a meridional image plane on the d-line, and the solid line ΔS represents a sagittal image plane on the d-line. Distortion is shown with respect to the d-line. An F number is represented by Fno and a half angle of view (degree) is represented by ω.

The zoom lens of the present invention is compact as an entire lens system, and has a wide angle of view, a high zoom ratio, and high optical performance over the entire zoom range. The zoom type of the zoom lens of the present invention is a negative lead type in which a lens unit having a negative refractive power is located ahead.

Related-art negative lead type zoom lenses include, in order from an object side to an image side, first lens units having a negative refractive power and second lens units having a positive refractive power. The first lens units are configured to move during zooming in many cases. In this lens configuration, an increase in angle of view leads to an increase in effective diameter of the first lens unit, which increases a load for driving the first lens unit. Consequently, a drive motor is increased in size, and hence it is difficult to downsize a lens barrel. In addition, it is difficult to perform high-speed zooming or focusing.

In contrast to this, in the present invention, on the image side of the first lens unit L1 having a negative refractive power, which is configured not to move during zooming, the second lens unit L2 having a negative refractive power is arranged. The second lens unit L2 functions as a focus lens unit and the lens unit (compensator lens unit) configured to correct image plane variation due to zooming.

In this case, the first lens unit L1, which has an effective diameter that tends to be increased along an increase in angle of view, is configured not to move during zooming so that the second lens unit L2, which is a moving lens unit, is downsized. In addition, a drive load for zooming or focusing is reduced, which facilitates downsizing of the motor and downsizing of the lens barrel. Further, the first lens unit L1 includes two or more negative lenses. With this configuration, the curvature of each lens surface is reduced while strong negative refractive power is maintained so that high optical performance is obtained through suppression of the generation of spherical aberration, and an increase in angle of view is facilitated.

Further, in each Embodiment, a focal length of the first lens unit L1 is represented by f1. A focal length of the entire lens system at the wide angle end is represented by fw. A focal length of the entire lens system at the telephoto end is represented by ft. An interval on the optical axis between the first lens unit L1 and the second lens unit L2 at the wide angle end is represented by D12w. A back focus at the wide angle end is represented by BFw. In this case, the following conditional expressions are satisfied.

$$0.70<|f1/(fw\times ft)^{(1/2)}|<2.70 \qquad (1)$$

$$0.60<D12w/BFw<5.30 \qquad (2)$$

Next, with reference to FIG. 13, there are described positional relationships of the lens units at the wide angle end and the telephoto end and numerical values related to movement amounts during zooming in the zoom lens of the present invention. In FIG. 13, a distance on the optical axis from a lens surface closest to the image side of the first lens unit L1 to a lens surface closest to the object side of the second lens unit L2 at the wide angle end is represented by D12w. Further, the movement amount of the third lens unit L3 from the wide angle end to the telephoto end is represented by M3 wt, and a total lens length (air-converted distance from the first lens surface to the image plane) is represented by TL.

The third lens unit L3, which is the magnification varying lens unit, is configured to monotonously move toward the object side and the second lens unit L2 is configured to move along a locus convex to the image side, in zooming from the wide angle end to the telephoto end. In this case, the third lens unit L3 is configured to move so that a surface closest to the object side of the third lens unit L3 is located closer to the object side than the lens surface closest to the object side of the second lens unit L2 is at the wide angle end. As described above, the third lens unit L3, which is the main magnification varying lens unit, is configured to greatly move toward the object side so as to overlap the movement locus of the second lens unit L2, which is the compensator lens unit. In this way, a high zoom ratio is obtained while the entire lens system is downsized.

Next, the technical meanings of the above-mentioned conditional expressions are described. Conditional Expression (1) sets a relationship between the focal length of the first lens unit L1 and the product of a focal length of the entire lens system at the wide angle end and a focal length of the entire lens system at the telephoto end. The first lens unit L1 has a relatively strong negative refractive power to increase the angle of view. When the negative focal length of the first lens unit L1 is increased (the absolute value of the negative focal length is increased), and the ratio exceeds the upper limit of Conditional Expression (1), it is difficult to obtain an effect of increasing the angle of view.

When the negative focal length of the first lens unit L1 is reduced (the absolute value of the negative focal length is reduced), and the ratio falls below the lower limit of Conditional Expression (1), spherical aberration is increased at the telephoto end, which is not preferred.

Conditional Expression (2) defines a ratio of the interval (distance on optical axis) between the first lens unit L1 and the second lens unit L2 at the wide angle end to the back focus. In order to downsize the entire lens system and increase the zoom ratio, it is necessary to appropriately set a positional relationship between the first lens unit L1 and the second lens unit L2 at the wide angle end. The back focus BFw is an air-converted distance from a final lens surface to the image plane at the wide angle end (the length of a glass block member G is an air-converted length).

When the interval between the first lens unit L1 and the second lens unit L2 is reduced and the ratio falls below the lower limit of Conditional Expression (2), the movement locus of the second lens unit L2, which is the compensator lens unit, is limited. As a result, it is difficult to sufficiently secure the movement locus of the second lens unit L2 in magnification varying, resulting in difficulty in increasing the zoom ratio. When the interval between the first lens unit L1 and the second lens unit L2 is increased and the ratio exceeds the upper limit of Conditional Expression (2), the first lens unit L1, at which the diameters of light fluxes are large, is located on the object side, and hence the effective diameter of the lens is increased, resulting in difficulty in downsizing the entire lens system.

As described above, according to the present invention, there is obtained a zoom lens that has an image pickup half angle of view of 60° or more and a zoom ratio of 2.5, and can therefore support image pickup elements having pixel counts of full HD or 4 K.

The focal length of the first lens unit L1 is represented by f1, and the focal length of the second lens unit L2 is represented by f2. The movement amount of the third lens unit L3 in zooming from the wide angle end to the telephoto end is represented by M3 wt. Here, the sign of the movement amount of the lens unit is negative when the lens unit is located closer to the object side at the telephoto end than at the wide angle end as a result of movement for zooming from the wide angle end to the telephoto end. When the lens unit is located closer to the image side, on the other hand, the sign is positive.

A distance (lens unit length) from a lens surface closest to the object side of the first lens unit L1 to the lens surface closest to the image side of the first lens unit L1 is represented by TL1G. A focal length of the third lens unit L3 is represented by f3. A lateral magnification of the third lens unit L3 at the wide angle end is represented by β3w, and a lateral magnification of the third lens unit L3 at the telephoto end is represented by β3t. A distance (total lens length) from a lens surface closest to the object side to the image plane is represented by TL. The back focus at the wide angle end is represented by BFw. The focal length of the entire lens system at the wide angle end is represented by fw. The focal length of the entire lens system at the telephoto end is represented by ft.

In this case, it is preferred to satisfy at least one of the following conditional expressions.

$$0.10 < f1/f2 < 1.00 \quad (3)$$

$$0.50 < |M3wt1/f3| < 3.00 \quad (4)$$

$$3.00 < TL1G/fw < 6.00 \quad (5)$$

$$-3.20 < f2/f3 < -1.20 \quad (6)$$

$$0.30 < f3/ft < 1.00 \quad (7)$$

$$5.0 < TL/BFw < 35.0 \quad (8)$$

Further, it is preferred to satisfy the following conditional expression when the zoom lens of the present invention is applied to an image pickup apparatus including an image pickup element. The image pickup half angle of view at the wide angle end is represented by $\omega w$, and the image pickup half angle of view at the telephoto end is represented by $\omega t$. A lateral magnification of the third lens unit L3 at the wide angle end is represented by β3w, and a lateral magnification of the third lens unit L3 at the telephoto end is represented by β3t. In this case, it is preferred to satisfy the following conditional expression.

$$1.50 < (\tan \omega w / \tan \omega t)/(\beta 3t/\beta 3w) < 7.00 \quad (9)$$

The technical meaning of each conditional expression is described next. Conditional Expression (3) defines a relationship between the focal length of the first lens unit L1, which has a relatively strong negative refractive power to increase the angle of view, and the focal length of the second lens unit L2, which is configured to move to correct image plane variation accompanying magnification varying and to perform focusing. When the negative focal length of the first lens unit L1 is increased (the absolute value of the negative focal length is increased), and the ratio exceeds the upper limit of Conditional Expression (3), the effect of increasing the angle of view is not sufficiently obtained, and the effective diameter of the lens is increased, resulting in difficulty in downsizing the entire lens system.

Further, when the negative focal length of the second lens unit L2 is reduced (the absolute value of the negative focal length is reduced), and the ratio exceeds the upper limit of Conditional Expression (3), curvature of field is increased. When the focal length of the first lens unit L1 is reduced and the ratio falls below the lower limit of Conditional Expression (3), spherical aberration is increased at the telephoto end. Further, when the negative focal length of the second lens unit L2 is increased and the ratio falls below the lower limit of Conditional Expression (3), the movement amount of the second lens unit L2 during zooming from the wide angle end to the telephoto end is increased, resulting in difficulty in downsizing the entire lens system.

Conditional Expression (4) appropriately sets a relationship between the focal length of the third lens unit L3 and the movement amount of the third lens unit L3, which is the main magnification varying lens unit, in zooming from the wide angle end to the telephoto end. When the focal length of the third lens unit L3 with respect to the movement amount of the third lens unit L3 is reduced and the ratio exceeds the upper limit of Conditional Expression (4), curvature of field and chromatic aberration are increased over the entire zoom range, and it is difficult to correct those various aberrations. When the focal length of the third lens unit L3 with respect to the movement amount of the third lens unit L3 is increased and the ratio falls below the lower limit of Conditional Expression (4), the positive refractive power of the magnification varying lens unit is weakened, resulting in difficulty in increasing the zoom ratio.

Conditional Expression (5) defines the lens unit length of the first lens unit L1. When Conditional Expression (5) is satisfied, aberration is satisfactorily corrected while the angle of view is increased. When the lens unit length of the first lens unit L1 is increased and the ratio exceeds the upper limit of Conditional Expression (5), it is difficult to downsize the entire lens system. When the lens unit length of the first lens unit L1 is reduced and the ratio falls below the lower limit of Conditional Expression (5), it is necessary to reduce the negative focal length in order to give the first lens unit L1 a predetermined negative refractive power, with the result that spherical aberration is increased at the telephoto end.

Conditional Expression (6) sets a relationship between the focal length of the third lens unit L3 serving as a main magnification varying lens unit and the focal length of the second lens unit L2, which is required to have a negative refractive power as the focus lens unit. When the negative focal length of the second lens unit L2 is reduced and the ratio exceeds the upper limit of Conditional Expression (6), curvature of field is increased. Further, when the focal length of the third lens unit L3, which performs magnification varying, is increased too much and the ratio exceeds the upper limit of Conditional Expression (6), the movement amount of the third lens unit L3 during zooming from the wide angle end to the telephoto end is increased, resulting in difficulty in downsizing the entire lens system.

When the negative focal length of the second lens unit L2 is increased and the ratio falls below the lower limit of Conditional Expression (6), the movement amount of the second lens unit L2 during zooming from the wide angle end to the telephoto end is increased, resulting in difficulty in downsizing the entire lens system. Further, when the focal length of the third lens unit L3 is reduced and the ratio falls below the lower limit of Conditional Expression (6), curvature of field and chromatic aberration are increased over the entire zoom range, and it is difficult to correct those various aberrations.

Conditional Expression (7) appropriately sets a relationship between the focal length of the third lens unit L3, which performs magnification varying, and the focal length of the entire lens system at the telephoto end so that satisfactory optical performance is obtained while the zoom ratio is increased and the entire lens system is downsized. When the focal length of the third lens unit L3, which performs magnification varying, is increased too much and the ratio exceeds the upper limit of Conditional Expression (7), the movement amount of the third lens unit L3 during zooming from the wide angle end to the telephoto end is increased, resulting in difficulty in downsizing the entire lens system. When the focal length of the third lens unit L3 is reduced and the ratio falls below the lower limit of Conditional Expression (7), curvature of field and chromatic aberration are increased over the entire zoom range, and it is difficult to correct those various aberrations.

Conditional Expression (8) defines a ratio of the total lens length to the back focus at the wide angle end. When the back focus is reduced too much and the ratio exceeds the upper limit of Conditional Expression (8), a space between the final lens surface and the image plane in which a filter, for example, a low pass filter is arranged is reduced, which is not preferred. When the back focus is increased too much and the ratio falls below the lower limit of Conditional Expression (8), it is difficult to secure a sufficient space for movement of each lens unit in magnification varying and to downsize the entire lens system.

Conditional Expression (9) defines a relationship of a change in image pickup angle of view of the third lens unit L3 during magnification varying, which serves as the main magnification varying lens unit. The image pickup half angle of view $\omega w$ and the image pickup half angle of view $\omega t$ both indicate an image pickup possible range including distortion. When the change exceeds the upper limit of Conditional Expression (9), distortion is increased at the wide angle end, which is not preferred. When the change falls below the lower limit of Conditional Expression (9), it is difficult to obtain a required change in image pickup angle of view by zooming (higher zoom ratio).

It is more preferred to set the numerical value ranges of Conditional Expressions (1) to (9) as follows.

$$1.00<|f1/(fw \times ft)^{(1/2)}|<2.40 \tag{1a}$$

$$0.90<D12w/BFw<5.00 \tag{2a}$$

$$0.25<f1/f2<0.95 \tag{3a}$$

$$0.80<|M3wt|/f3<2.5 \tag{4a}$$

$$3.40<TL1G/fw<5.50 \tag{5a}$$

$$-3.10<f2/f3<-1.50 \tag{6a}$$

$$0.40<f3/ft<0.95 \tag{7a}$$

$$7.0<TL/BFw<30.0 \tag{8a}$$

$$2.00<(\tan \omega w/\tan \omega t)/(\beta 3t/\beta 3w)<6.60 \tag{9a}$$

It is more preferred to set the numerical value ranges of Conditional Expressions (1a) to (9a) as follows.

$$1.50<|f1/(fw \times ft)^{(1/2)}|<1.90 \tag{1b}$$

$$1.20<D12w/BFw<4.70 \tag{2b}$$

$$0.40<f1/f2<0.90 \tag{3b}$$

$$1.10<|M3wt|/f3<2.00 \tag{4b}$$

$$3.80<TL1G/fw<5.00 \tag{5b}$$

$$-2.9<f2/f3<-1.80 \tag{6b}$$

$$0.50<f3/ft<0.90 \tag{7b}$$

$$9.0<TL/BFw<26.0 \tag{8b}$$

$$2.30<(\tan \omega w/\tan \omega t)/(\beta 3t/\beta 3w)<6.30 \tag{9b}$$

Further, a distance from the lens surface closest to the image side of the first lens unit L1 to a lens surface closest to the object side of the third lens unit L3 at the telephoto end is represented by D13t. A movement amount of the third lens unit L3 in zooming from the wide angle end to the telephoto end is represented by M3. In this case, the following conditional expressions are satisfied.

$$D13t<D12w \tag{10}$$

$$0.10<|M3|/TL<1.00 \tag{11}$$

Next, the technical meanings of the above-mentioned conditional expressions are described. Conditional Expression (10) defines a relationship between the distance on the optical axis from the first lens unit L1 to the second lens unit L2 at the wide angle end, and a distance on the optical axis from the first lens unit L1 to the third lens unit L3 at the telephoto end.

The third lens unit L3, which is the magnification varying lens unit, is configured to monotonously move toward the object side and the second lens unit L2 is configured to move along a locus convex to the image side, during zooming from the wide angle end to the telephoto end. In this case, the third lens unit L3 is configured to move so that the lens surface closest to the object side of the third lens unit L3 is located closer to the object side than the lens surface closest to the object side of the second lens unit L2 is at the wide angle end. As described above, the third lens unit L3, which is the main magnification varying lens unit, is configured to greatly move toward the object side so as to overlap the movement locus of the second lens unit L2, which is the compensator lens unit. In this way, a high zoom ratio is obtained while the entire lens system is downsized.

Conditional Expression (11) defines a ratio of the movement amount M3 of the third lens unit L3 in zooming from the wide angle end to the telephoto end to the total lens length. The movement amount of the third lens unit L3, which is the main magnification varying lens unit, with respect to the total lens length is appropriately set so that the entire system of the zoom lens is downsized and the zoom ratio is increased.

When the movement amount of the third lens unit L3 with respect to the total lens length is increased and the ratio exceeds the upper limit of Conditional Expression (11), the movement locus of the second lens unit L2, which is the focus lens unit, is limited, resulting in difficulty in correcting image plane variation accompanying magnification varying. When the movement amount of the third lens unit L3 with respect to the total lens length is reduced and the ratio falls below the lower limit of Conditional Expression (11), it is difficult to obtain a desired zoom ratio, that is, it is difficult to increase the zoom ratio.

As described above, according to the present invention, there is obtained a zoom lens that has an image pickup half angle of view of 60° or more and a zoom ratio of 2.5, and can therefore support image pickup elements having pixel counts of full HD or 4 K.

In each Embodiment, it is preferred to satisfy at least one of the following conditional expressions.

$$-5.00 < f1/fw < -2.00 \tag{12}$$

$$1.5 < \beta 3t/\beta 3w < 7.0 \tag{13}$$

Conditional Expression (12) defines a ratio of the focal length of the first lens unit L1 to the focal length fw of the entire lens system at the wide angle end. When the absolute value of the negative focal length of the first lens unit L1 is reduced and the ratio exceeds the upper limit value of Conditional Expression (12), spherical aberration is increased at the telephoto end. Further, when the absolute value of the negative focal length f1 of the first lens unit L1 is increased and the ratio falls below the lower limit value of Conditional Expression (12), it is difficult to increase the angle of view, that is, it is difficult to obtain a desired angle of view at the wide angle end.

Conditional Expression (13) defines a ratio of the lateral magnification of the third lens unit L3, which is the main magnification varying lens unit, at the telephoto end to the lateral magnification of the third lens unit L3 at the wide angle end, namely, a magnification varying ratio. When the ratio exceeds the upper limit of Conditional Expression (13), the magnification varying ratio of the third lens unit L3 is large but the refractive power of the third lens unit L3 is too strong, with the result that curvature of field and chromatic aberration are increased over the entire zoom range, and it is difficult to correct those various aberrations. When the ratio falls below the lower limit of Conditional Expression (13), it is difficult to obtain a desired zoom ratio, that is, it is difficult to increase the zoom ratio of the entire lens system.

It is more preferred to set the numerical value ranges of Conditional Expressions (11) to (13) as follows.

$$0.15 < |M3|/TL < 0.70 \tag{11a}$$

$$-4.60 < f1/fw < -2.50 \tag{12a}$$

$$1.5 < \beta 3t/\beta 3w < 5.0 \tag{13a}$$

It is more preferred to set the numerical value ranges of Conditional Expressions (11a) to (13a) as follows.

$$0.20 < |M3|/TL < 0.40 \tag{11b}$$

$$-4.20 < f1/fw < -2.90 \tag{12b}$$

$$2.0 < \beta 3t/\beta 3w < 4.0 \tag{13b}$$

In each Embodiment, the second lens unit L2 includes one lens or one cemented lens obtained by cementing a plurality of lenses, and the lens surface closest to the object side of the second lens unit L2 has a concave shape. The second lens unit L2 is configured to move during focusing. The second lens unit L2 is configured to move toward the image side and then move toward the object side, and the third lens unit L3 is configured to move toward the object side, during zooming from the wide angle end to the telephoto end. Embodiments 1, 2, 3, and 5 further include the fourth lens unit L4 having a negative refractive power on the image side of the third lens unit L3. The fourth lens unit L4 is configured to move during zooming.

The zoom lens of Embodiment 6 includes the fourth lens unit L4 having a positive refractive power, which is arranged on the image side of the third lens unit L3, and the fifth lens unit L5 having a negative refractive power, which is arranged closely to the fourth lens unit L4 on the image side of the fourth lens unit L4. The fourth lens unit L4 and the fifth lens unit L5 are configured to move during zooming.

Now, the lens configuration of each lens unit of each Embodiment is described. In the following, unless otherwise noted, the lens units are arranged in order from the object side to the image side in the lens configuration of each lens unit.

Embodiment 1

The first lens unit L1 includes a meniscus negative lens G11 having a surface convex to the object side, a meniscus negative lens G12 having a surface convex to the object side, a biconcave negative lens G13, and a meniscus positive lens G14 having a surface convex to the object side. The negative lens G11 has the meniscus shape, and hence the effective diameter of the lens is reduced as much as possible. Further, the first lens unit L1 includes the plurality of negative lenses to reduce various aberrations that are generated due to the negative refractive power of the first lens unit L1 having a negative refractive power that is made strong to increase the angle of view.

The second lens unit L2 includes a meniscus positive lens G21 having a surface convex to the image side, and a meniscus negative lens G22 having a surface convex to the image side. The positive lens G21 and the negative lens G22, which are cemented to form a cemented lens, are made of materials having greatly different Abbe numbers so that chromatic aberration is satisfactorily corrected.

The third lens unit L3 includes a biconvex positive lens G31, a biconvex positive lens G32, a biconcave negative lens G33, and a biconvex positive lens G34. The positive lens G32 and the negative lens G33, which are cemented to form a cemented lens, are made of materials having greatly different Abbe numbers so that chromatic aberration is satisfactorily corrected. Further, both the surfaces of the positive lens G31 and the positive lens G34 have aspherical shapes.

With this, the aspherical surfaces are appropriately arranged in the third lens unit L3 at which an axial light flux for determining an F number (Fno) spreads so that spherical aberration, which tends to be generated along an increase in aperture ratio, can be satisfactorily corrected. The fourth lens unit L4 includes a meniscus positive lens G41 having a surface convex to the image side, and a meniscus negative lens G42 having a surface convex to the image side.

Embodiment 2

The lens configurations of the first lens unit L1 to the fourth lens unit L4 in Embodiment 2 are the same as those in Embodiment 1. The expression "the lens configurations are the same" means that the arrangement of lenses and the shapes of lenses are the same.

Embodiment 3

The lens configurations of the first lens unit L1 and the third lens unit L3 in Embodiment 3 are the same as those in Embodiment 1. The second lens unit L2 includes a meniscus negative lens G21 having a surface convex to the image side. The fourth lens unit L4 includes a meniscus positive lens G41 having a surface convex to the image side, and a biconcave negative lens G42.

Embodiment 4

The lens configuration of the second lens unit L2 in Embodiment 4 is the same as that in Embodiment 1. The first lens unit L1 includes a meniscus negative lens G11 having a surface convex to the object side, a meniscus negative lens G12 having a surface convex to the object side, a meniscus negative lens G13 having a surface convex to the object side, and a meniscus positive lens G14 having a surface convex to the object side. The negative lens G11 has the meniscus shape, and hence the effective diameter of the lens is reduced as much as possible. Further, the first lens unit L1 includes the plurality of negative lenses to reduce various aberrations that are generated due to the negative refractive power of the first lens unit L1 having a negative refractive power that is made strong to increase the angle of view.

The third lens unit L3 includes a biconvex positive lens G31, a biconvex positive lens G32, a biconcave negative lens G33, a meniscus positive lens G34 having a surface convex to the object side, and a meniscus positive lens G35 having a surface convex to the object side. The positive lens G32 and the negative lens G33, which are cemented to form a cemented lens, are made of materials having greatly different Abbe numbers so that chromatic aberration is satisfactorily corrected.

Further, both the surfaces of the positive lens G31 and the positive lens G34 have aspherical shapes. With this, the aspherical surfaces are appropriately arranged in the third lens unit L3 at which an axial light flux for determining the F number spreads so that spherical aberration, which tends to be generated along an increase in aperture ratio, can be satisfactorily corrected.

Embodiment 5

The lens configurations of the first lens unit L1 and the second lens unit L2 in Embodiment 5 are the same as those in Embodiment 1. The third lens unit L3 includes a meniscus positive lens G31 having a surface convex to the object side, a biconvex positive lens G32, a biconcave negative lens G33, and a biconvex positive lens G34. The positive lens G32 and the negative lens G33, which are cemented to form a cemented lens, are made of materials having greatly different Abbe numbers so that chromatic aberration is satisfactorily corrected. Further, both the surfaces of the positive lens G31 and the positive lens G34 have aspherical shapes.

With this, the aspherical surfaces are appropriately arranged in the third lens unit L3 at which an axial light flux for determining the F number spreads so that spherical aberration, which tends to be generated along an increase in aperture ratio, can be satisfactorily corrected. The fourth lens unit L4 includes a meniscus negative lens G41 having a surface convex to the image side.

Embodiment 6

The lens configurations of the first lens unit L1 and the second lens unit L2 in Embodiment 6 are the same as those in Embodiment 1. The third lens unit L3 includes a biconvex positive lens G31, a biconvex positive lens G32, a biconcave negative lens G33, and a meniscus positive lens G34 having a surface convex to the object side. The positive lens G32 and the negative lens G33, which are cemented to form a cemented lens, are made of materials having greatly different Abbe numbers so that chromatic aberration is satisfactorily corrected. Further, both the surfaces of the positive lens G31 and the positive lens G34 have aspherical shapes.

With this, the aspherical surfaces are appropriately arranged in the third lens unit L3 at which an axial light flux for determining the F number spreads so that spherical aberration, which tends to be generated along an increase in aperture ratio, can be satisfactorily corrected. The fourth lens unit L4 includes a meniscus positive lens G41 having a surface convex to the object side. The fifth lens unit L5 includes a meniscus negative lens G51 having a surface convex to the image side.

Next, there is described an image pickup apparatus (monitoring camera) according to an embodiment of the present invention that uses the zoom lens of the present invention as an image pickup optical system, with reference to FIG. 14A and FIG. 14B.

FIG. 14A is an illustration of a monitoring camera 10. The monitoring camera 10 includes a monitoring camera body 11 and an image pickup optical system 16 that is the zoom lens according to any one of Embodiments 1 to 6. The monitoring camera body 11 has a built-in image pickup element (photoelectric transducer) 12 configured to receive object images formed by the image pickup optical system 16. The image pickup element 12 is, for example, a CCD sensor or a CMOS sensor. A memory portion 13 records information corresponding to the object image that has been photoelectrically converted by the image pickup element 12.

A network cable 14 transfers the object image that has been photoelectrically converted by the image pickup element 12. Further, FIG. 14B is an illustration of an example of an image pickup apparatus 10 in which the zoom lens is covered with a dome cover 15 is mounted on a ceiling for use.

The image pickup apparatus of the present invention is not limited to a monitoring camera, and may be a video camera, a digital camera, or the like.

As described above, according to each Embodiment, it is possible to obtain a zoom lens that achieves a compact entire system, an ultra-wide angle of view, and a high zoom ratio, and an image pickup apparatus including the zoom lens.

In each Embodiment, the following configurations may be adopted.

Changing the lens shape and the number of lenses as appropriate without limiting to those described in each Embodiment.

Correcting an image blur accompanying a vibration, for example, shaking by moving some of the lenses and the lens units so as to have a component in a direction perpendicular to the optical axis.

Correcting the distortions and the lateral chromatic aberration by an electric correction unit.

Although the exemplary embodiments of the present invention have been described so far, the present invention is by no means limited to those embodiments or optical specifications (angle of view and Fno), and hence various changes can be made within the scope of the gist of the present invention.

Next, numerical value data of Embodiments corresponding to the respective Embodiments are described. In the numerical value data of each Embodiment, surface number i indicates the order of an optical surface counted from the object side. Symbol ri represents a curvature radius of the i-th optical surface, di represents a surface interval between the i-th surface and the (i+1)-th surface, and ndi and vdi represent a refractive index and an Abbe constant with respect to the d-line of an optical medium between the i-th surface and the (i+1)-th surface, respectively. Further, the two surfaces that are closest to and second closest to the image side are the surfaces of a glass member, for example, a face plate. Surface numbers suffixed with "*" represent aspherical surfaces.

Back focus (BF) is an air-equivalent distance between a final lens surface and a paraxial image plane. The total lens length is defined as a value obtained by adding the back focus (BF) to a distance between a front lens surface and the final lens surface. In addition, symbol K represents an eccentricity, symbols A4, A6, A8, and A10 represent aspherical coefficients, and a displacement in the optical axis direction at a position of height H from the optical axis with respect to a surface apex is represented by symbol X. Then, an aspherical shape is expressed by the following expression.

$$X = \frac{(1/R)H^2}{1+\sqrt{1-(1+K)(H/R)^2}} + A4H^4 + A6H^6 + A8H^8 + A10H^{10}$$

where R represents a curvature radius. Further, for example, the expression of "e-Z" means "$10^{-z}$". In addition, a relationship between the conditional expressions described above and Embodiments is shown in Table 1. Symbol F represents the focal length (d-line), symbol Fno represents the F number, and the half angle of view (ω) is a numerical value concerning an angle of view that can be photographed in consideration of an amount of distortion.

[Numerical Data 1]

| Unit mm | | | | |
|---|---|---|---|---|
| Surface data | | | | |
| Surface number i | ri | di | ndi | vdi |
| 1 | 49.075 | 1.70 | 1.69680 | 55.5 |
| 2 | 29.005 | 4.19 | | |
| 3 | 41.644 | 1.30 | 1.69680 | 55.5 |
| 4 | 16.380 | 10.08 | | |
| 5 | −50.092 | 0.90 | 1.59522 | 67.7 |
| 6 | 44.046 | 1.80 | | |
| 7 | 32.719 | 2.57 | 1.95906 | 17.5 |
| 8 | 69.216 | (Variable) | | |
| 9 | −13.005 | 0.98 | 1.89286 | 20.4 |
| 10 | −11.074 | 0.45 | 1.69680 | 55.5 |
| 11 | −60.576 | (Variable) | | |
| 12 (Stop) | ∞ | 0.40 | | |
| 13* | 11.412 | 3.99 | 1.58313 | 59.4 |
| 14* | −57.464 | 0.74 | | |
| 15 | 14.515 | 5.00 | 1.49700 | 81.5 |
| 16 | −13.184 | 0.45 | 1.90366 | 31.3 |
| 17 | 16.567 | 1.17 | | |
| 18* | 9.091 | 4.15 | 1.49710 | 81.6 |
| 19* | −32.945 | (Variable) | | |
| 20 | −116.812 | 2.64 | 1.95906 | 17.5 |
| 21 | −27.431 | 3.47 | | |
| 22 | −15.752 | 0.60 | 1.74950 | 35.3 |
| 23 | −287.447 | (Variable) | | |
| 24 | ∞ | 2.00 | 1.54400 | 60.0 |
| Image plane | ∞ | | | |

| Aspherical surface data | | |
|---|---|---|
| Thirteenth surface | | |
| K = 0.00000e+000 | A4 = −4.61684e−005 | A6 = 3.50702e−007 |
| A8 = −3.35096e−009 | A10 = −4.83765e−011 | |
| Fourteenth surface | | |
| K = 0.00000e+000 | A4 = −2.05089e−005 | A6 = 1.13431e−006 |
| A8 = −1.50419e−008 | A10 = 1.60944e−011 | |
| Eighteenth surface | | |
| K = 0.00000e+000 | A4 = −2.33042e−004 | A6 = 4.11749e−006 |
| A8 = −3.74200e−008 | A10 = 5.65495e−010 | |
| Nineteenth surface | | |
| K = 0.00000e+000 | A4 = 2.55599e−004 | A6 = 4.35425e−006 |
| A8 = 6.13415e−009 | A10 = 1.02214e−009 | |

| Various data | | | |
|---|---|---|---|
| Zoom ratio 4.86 | | | |
| Focal length | 5.21 | 11.47 | 25.33 |
| F number | 1.86 | 2.86 | 4.28 |
| Half angle of view (degree) | 46.53 | 25.61 | 12.25 |
| Image height | 5.50 | 5.50 | 5.50 |
| Total lens length | 82.30 | 82.30 | 82.30 |
| BF | 5.25 | 16.97 | 30.19 |
| d8 | 17.02 | 15.52 | 2.15 |
| d11 | 11.06 | 2.56 | 0.93 |
| d19 | 2.41 | 0.69 | 2.46 |
| d23 | 1.48 | 13.19 | 26.41 |

| Zoom lens unit data | | |
|---|---|---|
| Unit | First surface | Focal length |
| 1 | 1 | −20.90 |
| 2 | 9 | −26.14 |
| 3 | 12 | 13.66 |
| 4 | 20 | −70.99 |

[Numerical Data 2]

Unit mm

Surface data

| Surface number i | ri | di | ndi | vdi |
|---|---|---|---|---|
| 1 | 43.244 | 1.30 | 1.69680 | 55.5 |
| 2 | 22.587 | 5.69 | | |
| 3 | 56.518 | 1.10 | 1.59522 | 67.7 |
| 4 | 14.979 | 8.11 | | |
| 5 | −37.756 | 0.80 | 1.59522 | 67.7 |
| 6 | 84.740 | 0.81 | | |
| 7 | 34.852 | 2.90 | 1.95906 | 17.5 |
| 8 | 90.794 | (Variable) | | |
| 9 | −12.086 | 0.90 | 1.89286 | 20.4 |
| 10 | −10.503 | 0.58 | 1.69680 | 55.5 |
| 11 | −51.261 | (Variable) | | |
| 12 (Stop) | ∞ | 0.40 | | |
| 13* | 11.598 | 3.80 | 1.58313 | 59.4 |
| 14* | −56.865 | 0.75 | | |
| 15 | 14.511 | 5.00 | 1.49700 | 81.5 |
| 16 | −12.803 | 0.45 | 1.90366 | 31.3 |
| 17 | 19.806 | 1.02 | | |
| 18* | 9.225 | 4.24 | 1.49710 | 81.6 |
| 19* | −27.772 | (Variable) | | |
| 20 | −99.993 | 2.80 | 1.95906 | 17.5 |
| 21 | −26.574 | 3.16 | | |
| 22 | −15.375 | 0.60 | 1.74950 | 35.3 |
| 23 | −288.945 | (Variable) | | |
| 24 | ∞ | 2.00 | 1.54400 | 60.0 |
| Image plane | ∞ | | | |

Aspherical surface data

Thirteenth surface

K = 0.00000e+000  A4 = −4.63158e−005  A6 = 4.90655e−007
A8 = −2.56615e−009  A10 = −7.48627e−011

Fourteenth surface

K = 0.00000e+000  A4 = −2.80673e−005  A6 = 1.33478e−006
A8 = −1.48174e−008  A10 = −2.75633e−011

Eighteenth surface

K = 0.00000e+000  A4 = −2.52457e−004  A6 = 4.57873e−006
A8 = −3.79259e−008  A10 = 5.90443e−010

Nineteenth surface

K = 0.00000e+000  A4 = 2.74061e−004  A6 = 4.18580e−006
A8 = 1.07312e−008  A10 = 1.05423e−009

Various data
Zoom ratio 3.90

| Focal length | 5.31 | 10.25 | 20.71 |
|---|---|---|---|
| F number | 1.84 | 2.62 | 3.80 |
| Half angle of view (degree) | 46.03 | 28.21 | 14.88 |
| Image height | 5.50 | 5.50 | 5.50 |
| Total lens length | 74.94 | 74.94 | 74.94 |
| BF | 5.25 | 14.64 | 24.69 |
| d8 | 13.31 | 12.04 | 2.10 |
| d11 | 9.37 | 2.77 | 0.91 |
| d19 | 2.59 | 1.07 | 2.82 |
| d23 | 1.85 | 11.24 | 21.28 |

Zoom lens unit data

| Unit | First surface | Focal length |
|---|---|---|
| 1 | 1 | −18.79 |
| 2 | 9 | −24.86 |
| 3 | 12 | 12.93 |
| 4 | 20 | −63.12 |

[Numerical Data 3]

Unit mm

Surface data

| Surface number i | ri | di | ndi | vdi |
|---|---|---|---|---|
| 1 | 30.155 | 1.30 | 1.69680 | 55.5 |
| 2 | 12.293 | 7.52 | | |
| 3 | 69.198 | 1.10 | 1.69680 | 55.5 |
| 4 | 26.528 | 4.22 | | |
| 5 | −26.742 | 0.80 | 1.59522 | 67.7 |
| 6 | 33.613 | 1.12 | | |
| 7 | 29.942 | 3.90 | 1.95906 | 17.5 |
| 8 | 170.469 | (Variable) | | |
| 9 | −10.677 | 0.50 | 1.49700 | 81.5 |
| 10 | −53.436 | (Variable) | | |
| 11 (Stop) | ∞ | 0.40 | | |
| 12* | 10.759 | 3.80 | 1.55332 | 71.7 |
| 13* | −47.271 | 0.17 | | |
| 14 | 17.209 | 5.00 | 1.43700 | 95.1 |
| 15 | −12.942 | 0.45 | 1.91650 | 31.6 |
| 16 | 31.092 | 0.72 | | |
| 17* | 9.725 | 4.80 | 1.55332 | 71.7 |
| 18* | −21.375 | (Variable) | | |
| 19 | −339.049 | 1.26 | 1.94595 | 18.0 |
| 20 | −25.356 | 2.05 | | |
| 21 | −16.022 | 0.60 | 1.76182 | 26.5 |
| 22 | 126.374 | (Variable) | | |
| 23 | ∞ | 2.00 | 1.54400 | 60.0 |
| Image plane | ∞ | | | |

Aspherical surface data

Twelfth surface

K = 0.00000e+000  A4 = −8.19120e−005  A6 = 5.73929e−007
A8 = −1.56980e−009  A10 = −2.53005e−010

Thirteenth surface

K = 0.00000e+000  A4 = −6.12498e−005  A6 = 2.10300e−006
A8 = −2.09520e−008  A10 = −1.87732e−010

Seventeenth surface

K = 0.00000e+000  A4 = −3.11039e−004  A6 = 4.63120e−006
A8 = −4.78806e−008  A10 = 2.26405e−010

Eighteenth surface

K = 0.00000e+000  A4 = 2.43140e−004  A6 = 3.08615e−006
A8 = 1.32269e−010  A10 = 3.15201e−010

Various data
Zoom ratio 2.89

| Focal length | 4.91 | 8.08 | 14.19 |
|---|---|---|---|
| F number | 1.67 | 2.22 | 3.00 |
| Half angle of view (degree) | 48.24 | 34.25 | 21.18 |
| Image height | 5.50 | 5.50 | 5.50 |
| Total lens length | 65.22 | 65.22 | 65.22 |
| BF | 5.94 | 13.08 | 20.74 |
| d8 | 8.47 | 8.32 | 2.22 |
| d10 | 8.05 | 2.86 | 0.96 |
| d18 | 3.03 | 1.23 | 1.59 |
| d22 | 1.20 | 8.33 | 15.99 |

Zoom lens unit data

| Unit | First surface | Focal length |
|---|---|---|
| 1 | 1 | −14.36 |
| 2 | 9 | −26.95 |
| 3 | 11 | 12.00 |
| 4 | 19 | −65.30 |

[Numerical Data 4]

Unit mm

Surface data

| Surface number i | ri | di | ndi | vdi |
|---|---|---|---|---|
| 1 | 38.472 | 1.70 | 1.69680 | 55.5 |
| 2 | 18.387 | 6.93 | | |
| 3 | 45.363 | 1.30 | 1.69680 | 55.5 |
| 4 | 17.536 | 5.48 | | |
| 5 | 165.663 | 0.90 | 1.59522 | 67.7 |
| 6 | 20.071 | 4.90 | | |
| 7 | 21.605 | 1.24 | 1.95906 | 17.5 |
| 8 | 31.757 | (Variable) | | |
| 9 | −12.502 | 1.00 | 1.89286 | 20.4 |
| 10 | −10.739 | 0.45 | 1.69680 | 55.5 |
| 11 | −41.108 | (Variable) | | |
| 12 (Stop) | ∞ | 0.40 | | |
| 13* | 9.378 | 3.51 | 1.58313 | 59.4 |
| 14* | −53.700 | 0.71 | | |
| 15 | 9.486 | 3.75 | 1.49700 | 81.5 |
| 16 | −12.581 | 0.45 | 1.90366 | 31.3 |
| 17 | 14.105 | 1.35 | | |
| 18* | 12.741 | 3.62 | 1.49710 | 81.6 |
| 19* | 64.411 | 4.69 | | |
| 20 | 12.093 | 3.26 | 1.85478 | 24.8 |
| 21 | 11.946 | (Variable) | | |
| 22 | ∞ | 2.00 | 1.54400 | 60.0 |
| Image plane | ∞ | | | |

Aspherical surface data

Thirteenth surface

K = 0.00000e+000   A4 = 1.28333e−005   A6 = 3.96145e−007
A8 = −8.52497e−009  A10 = −4.16640e−011

Fourteenth surface

K = 0.00000e+000   A4 = 9.89357e−005   A6 = −5.06533e−008
A8 = −2.57349e−008  A10 = 1.87913e−010

Eighteenth surface

K = 0.00000e+000   A4 = −1.95853e−004  A6 = −6.38323e−006
A8 = −3.89524e−007  A10 = −7.96355e−009

Nineteenth surface

K = 0.00000e+000   A4 = 4.11532e−004   A6 = 5.70748e−006
A8 = −7.64341e−007  A10 = 7.54527e−009

Various data
Zoom ratio 3.90

| | | | |
|---|---|---|---|
| Focal length | 4.80 | 9.35 | 18.72 |
| F number | 1.86 | 2.95 | 4.63 |
| Half angle of view (degree) | 48.89 | 30.47 | 16.37 |
| Image height | 5.50 | 5.50 | 5.50 |
| Total lens length | 71.30 | 71.30 | 71.30 |
| BF | 4.41 | 11.81 | 22.90 |
| d8 | 9.97 | 11.29 | 2.13 |
| d11 | 11.27 | 2.56 | 0.62 |
| d21 | 2.41 | 9.80 | 20.90 |

Zoom lens unit data

| Unit | First surface | Focal length |
|---|---|---|
| 1 | 1 | −17.47 |
| 2 | 9 | −28.87 |
| 3 | 12 | 11.34 |

[Numerical Data 5]

Unit mm

Surface data

| Surface number i | ri | di | ndi | vdi |
|---|---|---|---|---|
| 1 | 36.756 | 1.70 | 1.69680 | 55.5 |
| 2 | 15.125 | 6.94 | | |
| 3 | 40.147 | 1.30 | 1.69680 | 55.5 |
| 4 | 14.976 | 5.15 | | |
| 5 | −505.394 | 0.90 | 1.59522 | 67.7 |
| 6 | 25.274 | 0.99 | | |
| 7 | 20.849 | 1.44 | 1.95906 | 17.5 |
| 8 | 36.871 | (Variable) | | |
| 9 | −13.931 | 1.00 | 1.89286 | 20.4 |
| 10 | −12.807 | 0.45 | 1.69680 | 55.5 |
| 11 | −150.001 | (Variable) | | |
| 12 (Stop) | ∞ | 0.10 | | |
| 13* | 9.866 | 2.73 | 1.58313 | 59.4 |
| 14* | 70.012 | 0.52 | | |
| 15 | 10.411 | 2.87 | 1.49700 | 81.5 |
| 16 | −118.079 | 0.45 | 1.90366 | 31.3 |
| 17 | 13.626 | 2.03 | | |
| 18* | 8.670 | 3.36 | 1.49710 | 81.6 |
| 19* | −62.272 | (Variable) | | |
| 20 | −8.755 | 0.60 | 1.85478 | 24.8 |
| 21 | −10.750 | (Variable) | | |
| 22 | ∞ | 2.00 | 1.54400 | 60.0 |
| Image plane | ∞ | | | |

Aspherical surface data

Thirteenth surface

K = 0.00000e+000   A4 = −4.71946e−005  A6 = −5.94910e−007
A8 = 3.15429e−009   A10 = −2.94864e−010

Fourteenth surface

K = 0.00000e+000   A4 = −1.40642e−005  A6 = 6.52379e−007
A8 = −4.60192e−008  A10 = 3.18797e−010

Eighteenth surface

K = 0.00000e+000   A4 = −3.07501e−004  A6 = 5.74877e−007
A8 = −3.64648e−008  A10 = −6.56242e−009

Nineteenth surface

K = 0.00000e+000   A4 = 3.37333e−004   A6 = 3.52790e−006
A8 = −1.00775e−007  A10 = −5.00773e−009

Various data
Zoom ratio 3.94

| | | | |
|---|---|---|---|
| Focal length | 4.77 | 9.09 | 18.81 |
| F number | 1.86 | 2.89 | 4.28 |
| Half angle of view (degree) | 49.04 | 31.19 | 16.30 |
| Image height | 5.50 | 5.50 | 5.50 |
| Total lens length | 69.30 | 69.30 | 69.30 |
| BF | 2.69 | 2.69 | 2.69 |
| d8 | 13.40 | 12.35 | 1.59 |
| d11 | 9.22 | 2.11 | 0.63 |
| d19 | 11.48 | 19.64 | 31.89 |
| d21 | 0.68 | 0.68 | 0.68 |

Zoom lens unit data

| Unit | First surface | Focal length |
|---|---|---|
| 1 | 1 | −15.15 |
| 2 | 9 | −23.04 |
| 3 | 12 | 12.11 |
| 4 | 20 | −64.06 |
| 5 | 22 | ∞ |

[Numerical Data 6]

Unit mm

Surface data

| Surface number i | ri | di | ndi | vdi |
|---|---|---|---|---|
| 1 | 81.184 | 1.70 | 1.69680 | 55.5 |
| 2 | 24.232 | 3.30 | | |
| 3 | 27.212 | 1.30 | 1.69680 | 55.5 |
| 4 | 15.792 | 9.55 | | |
| 5 | −509.580 | 0.90 | 1.59522 | 67.7 |
| 6 | 25.972 | 3.97 | | |
| 7 | 19.772 | 1.53 | 1.95906 | 17.5 |
| 8 | 26.298 | (Variable) | | |
| 9 | −14.945 | 1.00 | 1.89286 | 20.4 |
| 10 | −13.068 | 0.45 | 1.69680 | 55.5 |
| 11 | −35.965 | (Variable) | | |
| 12 (Stop) | ∞ | 0.31 | | |
| 13* | 10.590 | 4.40 | 1.58313 | 59.4 |
| 14* | −63.791 | 0.64 | | |
| 15 | 13.792 | 4.02 | 1.49700 | 81.5 |
| 16 | −15.737 | 0.45 | 1.90366 | 31.3 |
| 17 | 15.450 | 1.30 | | |
| 18* | 9.506 | 5.36 | 1.49710 | 81.6 |
| 19* | 60.521 | (Variable) | | |
| 20 | 36.387 | 1.00 | 1.95906 | 17.5 |
| 21 | 497.918 | (Variable) | | |
| 22 | −14.552 | 0.60 | 1.74950 | 35.3 |
| 23 | −58.270 | (Variable) | | |
| 24 | ∞ | 2.00 | 1.54400 | 60.0 |
| Image plane | ∞ | | | |

Aspherical surface data

Thirteenth surface

K = 0.00000e+000  A4 = −3.56184e−005  A6 = 3.77001e−007
A8 = −4.93177e−009  A10 = −6.61398e−011

-continued

Unit mm

Fourteenth surface

K = 0.00000e+000  A4 = 7.28817e−006  A6 = 1.02043e−006
A8 = −2.06961e−008  A10 = 7.28757e−011

Eighteenth surface

K = 0.00000e+000  A4 = −1.78046e−004  A6 = 2.77005e−007
A8 = −9.53773e−008  A10 = −1.70793e−009

-continued

Unit mm

Nineteenth surface

K = 0.00000e+000  A4 = 2.67227e−004  A6 = 5.88560e−006
A8 = −3.01472e−007  A10 = 1.98075e−009

Various data
Zoom ratio 5.90

| | | | |
|---|---|---|---|
| Focal length | 4.55 | 11.60 | 26.82 |
| F number | 1.82 | 3.14 | 5.05 |
| Half angle of view (degree) | 50.40 | 25.37 | 11.59 |
| Image height | 5.50 | 5.50 | 5.50 |
| Total lens length | 84.30 | 84.30 | 84.30 |
| BF | 2.62 | 14.56 | 32.48 |
| d8 | 15.34 | 20.43 | 3.53 |
| d11 | 17.64 | 1.25 | 1.20 |
| d19 | 4.08 | 3.95 | 3.77 |
| d21 | 2.84 | 2.32 | 1.55 |
| d23 | 0.61 | 12.56 | 30.48 |

Zoom lens unit data

| Unit | First surface | Focal length |
|---|---|---|
| 1 | 1 | −18.92 |
| 2 | 9 | −41.58 |
| 3 | 12 | 14.48 |
| 4 | 20 | 40.89 |
| 5 | 22 | −26.03 |

TABLE 1

| | | Numerical Embodiment | | | | | |
|---|---|---|---|---|---|---|---|
| Conditional Expression | | 1 | 2 | 3 | 4 | 5 | 6 |
| (1) | $|f1/(fw \times ft)^{(1/2)}|$ | 1.82 | 1.79 | 1.72 | 1.84 | 1.60 | 1.71 |
| (2) | D12w/BFw | 2.86 | 2.24 | 1.28 | 1.95 | 3.96 | 4.62 |
| (3) | f1/f2 | 0.80 | 0.76 | 0.53 | 0.61 | 0.66 | 0.46 |
| (4) | $|M3wt|/f3$ | 1.83 | 1.52 | 1.11 | 1.63 | 1.69 | 1.95 |
| (5) | TL1G/fw | 4.32 | 3.90 | 4.06 | 4.68 | 3.86 | 4.89 |
| (6) | f2/f3 | −1.91 | −1.92 | −2.25 | −2.54 | −1.90 | −2.87 |
| (7) | f3/ft | 0.54 | 0.62 | 0.85 | 0.61 | 0.64 | 0.54 |
| (8) | TL/BFw | 13.58 | 12.40 | 9.44 | 14.10 | 20.70 | 25.66 |
| (9) | (tanωw/tanωt)/(β3t/β3w) | 3.66 | 3.25 | 2.77 | 2.31 | 2.37 | 6.24 |
| (11) | $|M3|/TL$ | 0.31 | 0.27 | 0.21 | 0.26 | 0.29 | 0.33 |
| (12) | f1/fw | −4.01 | −3.54 | −2.92 | −3.64 | −3.17 | −4.16 |
| (13) | β3t/β3w | 2.89 | 2.50 | 2.12 | 3.46 | 3.17 | 3.61 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-200023, filed Oct. 11, 2016, and Japanese Patent Application No. 2016-200024, filed Oct. 11, 2016, which are hereby incorporated by reference herein in their entirety.

What is claimed is:

1. A zoom lens, comprising, in order from an object side to an image side:
   a first lens unit having a negative refractive power;
   a second lens unit having a negative refractive power; and
   a third lens unit having a positive refractive power,
   wherein the first lens unit is not moved for zooming, the second lens unit and the third lens unit are moved during zooming, and an interval between each pair of adjacent lens units is changed during zooming,
   wherein the first lens unit comprises at least two negative lenses, and
   wherein the following conditional expressions are satisfied:

$0.70 < |f1/(fw \times ft)^{(1/2)}| < 2.70$; and $0.60 < D12w/BFw < 5.30$, where f1 represents a focal length of the first lens unit, fw represents a focal length of the zoom lens at a wide angle end, ft represents a focal length of the zoom lens at a telephoto end, D12w represents an interval on an optical axis between the first lens unit and the second lens unit at the wide angle end, and BFw represents a back focus at the wide angle end.

2. The zoom lens according to claim 1, wherein the following conditional expression is satisfied:

$0.10 < f1/f2 < 1.00$, where f2 represents a focal length of the second lens unit.

3. The zoom lens according to claim 1, wherein the following conditional expression is satisfied:

$0.50 < |M3wt|/f3 < 3.00$, where M3wt represents a movement amount of the third lens unit in zooming from the wide angle end to the telephoto end, and f3 represents a focal length of the third lens unit.

4. The zoom lens according to claim 1, wherein the following conditional expression is satisfied:

$3.00 < TL1G/fw < 6.00$, where TL1G represents a distance from a lens surface closest to the object side of the first lens unit to a lens surface closest to the image side of the first lens unit, and fw represents the focal length of the zoom lens at the wide angle end.

5. The zoom lens according to claim 1, wherein the following conditional expression is satisfied:

$-3.20 < f2/f3 < -1.20$, where f2 represents a focal length of the second lens unit, and f3 represents a focal length of the third lens unit.

6. The zoom lens according to claim 1, wherein the following conditional expression is satisfied:

$0.30 < f3/ft < 1.00$, where f3 represents a focal length of the third lens unit, and ft represents a focal length of the zoom lens at the telephoto end.

7. The zoom lens according to claim 1, wherein the following conditional expression is satisfied:

$5.0 < TL/BFw < 35.0$, where TL represents a distance from a lens surface closest to the object side to an image plane, and BFw represents the back focus at the wide angle end.

8. The zoom lens according to claim 1, wherein the second lens unit comprises one of a single lens and a cemented lens obtained by cementing a plurality of lenses, and a lens surface closest to the object side of the second lens unit has a concave shape.

9. The zoom lens according to claim 1, wherein the second lens unit is moved during focusing.

10. The zoom lens according to claim 1, wherein the second lens unit is moved toward the image side and then moved toward the object side and the third lens unit is moved toward the object side, during zooming from the wide angle end to the telephoto end.

11. The zoom lens according to claim 1, further comprising a fourth lens unit having a negative refractive power on the image side of the third lens unit,
    wherein the fourth lens unit is moved during zooming.

12. The zoom lens according to claim 1, further comprising:
    a fourth lens unit having a positive refractive power, which is arranged on the image side of the third lens unit; and
    a fifth lens unit having a negative refractive power, which is arranged adjacently to the fourth lens unit on the image side of the fourth lens unit,
    wherein the fourth lens unit and the fifth lens unit are moved during zooming.

13. An image pickup apparatus, comprising:
    the zoom lens of claim 1; and
    an image pickup element, which receives an image formed by the zoom lens.

14. The image pickup apparatus according to claim 13, wherein the following conditional expression is satisfied:

$1.50 < (\tan \omega w / \tan \omega t)/(\beta 3t/\beta 3w) < 7.00$, where ωw represents a half angle of view at the wide angle end, ωt represents a half angle of view at the telephoto end, β3w represents a lateral magnification of the third lens unit at the wide angle end, and β3t represents a lateral magnification of the third lens unit at the telephoto end.

15. A zoom lens, comprising, in order from an object side to an image side:
    a first lens unit having a negative refractive power;
    a second lens unit having a negative refractive power; and
    a third lens unit having a positive refractive power,
    wherein the first lens unit is not moved during zooming, the second lens unit and the third lens unit are moved during zooming, and an interval between each pair of adjacent lens units is changed during zooming,
    wherein the first lens unit comprises at least two negative lenses, and
    wherein the following conditional expressions are satisfied:

$D13t < D12w$; and $0.10 < |M3|/TL < 1.00$, where D12w represents a distance from a lens surface closest to the image side of the first lens unit to a lens surface closest to the object side of the second lens unit at a wide angle end, D13t represents a distance from the lens surface closest to the image side of the first lens unit to a lens surface closest to the object side of the third lens unit at a telephoto end, M3 represents a movement amount of the third lens unit in zooming from the wide angle end to the telephoto end, and TL represents a distance from a lens surface closest to the object side to an image plane.

16. The zoom lens according to claim 15, wherein the following conditional expression is satisfied:

$$-5.00 < f1/fw < -2.00,$$

where f1 represents a focal length of the first lens unit, and fw represents a focal length of an entire system of the zoom lens at the wide angle end.

17. The zoom lens according to claim 15, wherein the following conditional expression is satisfied:

$$1.5 < \beta 3t/\beta 3w < 7.0,$$

where β3w represents a lateral magnification of the third lens unit at the wide angle end, and β3t represents a lateral magnification of the third lens unit at the telephoto end.

\* \* \* \* \*